(12) United States Patent
Yagi et al.

(10) Patent No.: US 12,224,435 B2
(45) Date of Patent: Feb. 11, 2025

(54) STORAGE BATTERY

(71) Applicant: KABUSHIKI KAISHA TOSHIBA, Tokyo (JP)

(72) Inventors: Ryosuke Yagi, Yokohama Kanagawa (JP); Yasuhiro Harada, Isehara Kanagawa (JP); Norio Takami, Yokohama Kanagawa (JP); Tetsuya Sasakawa, Yokohama Kanagawa (JP); Norihiro Yoshinaga, Yokohama Kanagawa (JP); Yuta Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 17/580,529

(22) Filed: Jan. 20, 2022

(65) Prior Publication Data

US 2022/0149363 A1 May 12, 2022

Related U.S. Application Data

(63) Continuation of application No. PCT/JP2021/003748, filed on Feb. 2, 2021.

(30) Foreign Application Priority Data

Jul. 22, 2020 (JP) ................................ 2020-125399

(51) Int. Cl.
*H01M 4/485* (2010.01)
*H01M 4/02* (2006.01)
*H01M 4/583* (2010.01)

(52) U.S. Cl.
CPC ........... *H01M 4/485* (2013.01); *H01M 4/583* (2013.01); *H01M 2004/027* (2013.01)

(58) Field of Classification Search
CPC ................. H01M 4/485; H01M 4/583; H01M 2004/027; H01M 2220/20; H01M 50/51
See application file for complete search history.

(56) References Cited

U.S. PATENT DOCUMENTS

2012/0179435 A1* 7/2012 Song ..................... G01R 31/367
703/2
2014/0265554 A1 9/2014 Yang et al.
2015/0188188 A1 7/2015 Zhang et al.
(Continued)

FOREIGN PATENT DOCUMENTS

JP 2019-102226 A 6/2019
JP WO2019/187132 A1 10/2019

*Primary Examiner* — Aiqun Li
(74) *Attorney, Agent, or Firm* — Finnegan, Henderson, Farabow, Garrett & Dunner, LLP

(57) ABSTRACT

According to a storage battery of an embodiment includes a first battery module and a second battery module connected in parallel with the first battery module. The number of first cells connected in series in the first battery module is M, and the number of second cells connected in series in the second battery module is N. When an open circuit voltage at SOC=X % of the first cells and the second cells are Va1 (X) and Va2 (X), respectively, the voltages of the battery modules are M×Va1 (X)<N×Va2 (X) in the range where the SOC of the cell is 0% to 30%, and M×Va1 (X)>N×Va2 (X) in the range where the SOC of the cell is 70% to 100%.

2 Claims, 11 Drawing Sheets

(56) References Cited

U.S. PATENT DOCUMENTS

| | | |
|---|---|---|
| 2015/0243979 A1* | 8/2015 | Nakahara ............ H01M 10/052 |
| | | 429/231.1 |
| 2015/0331472 A1 | 11/2015 | Iwamoto et al. |
| 2018/0212213 A1 | 7/2018 | Kawai et al. |
| 2018/0212458 A1 | 7/2018 | Kawai et al. |
| 2018/0257507 A1 | 9/2018 | Kawai et al. |
| 2019/0067753 A1 | 2/2019 | Maksimovic et al. |

* cited by examiner

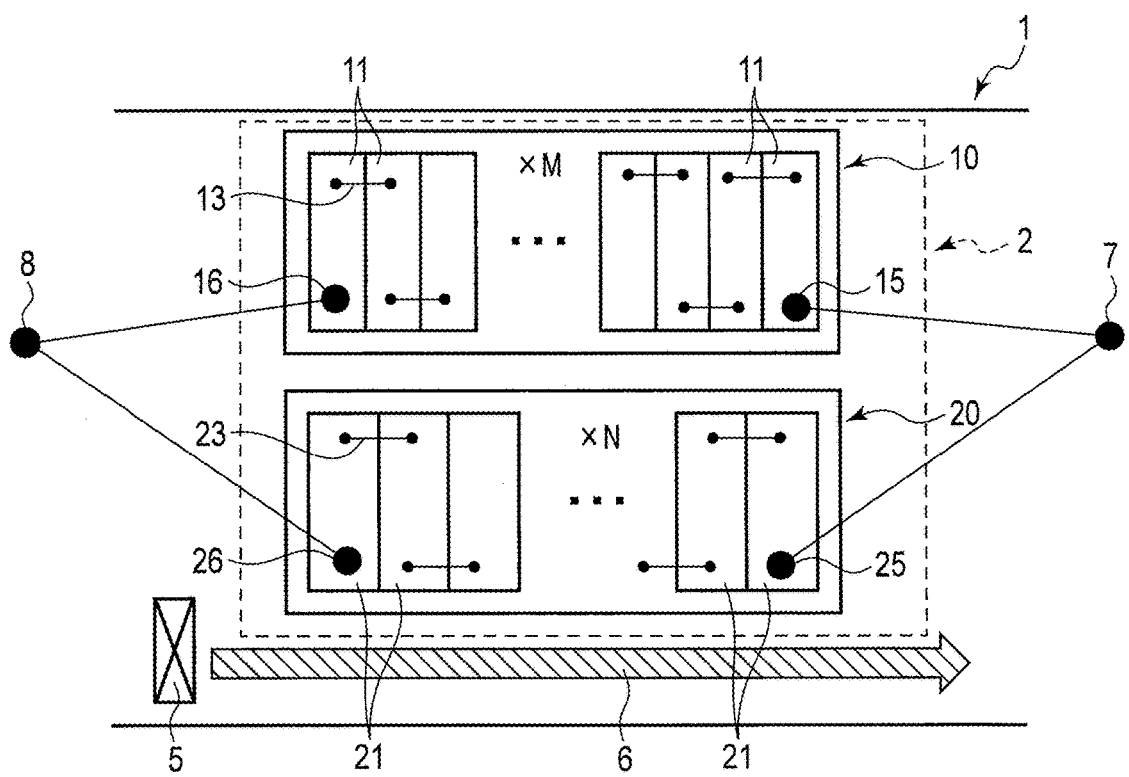
F I G. 1
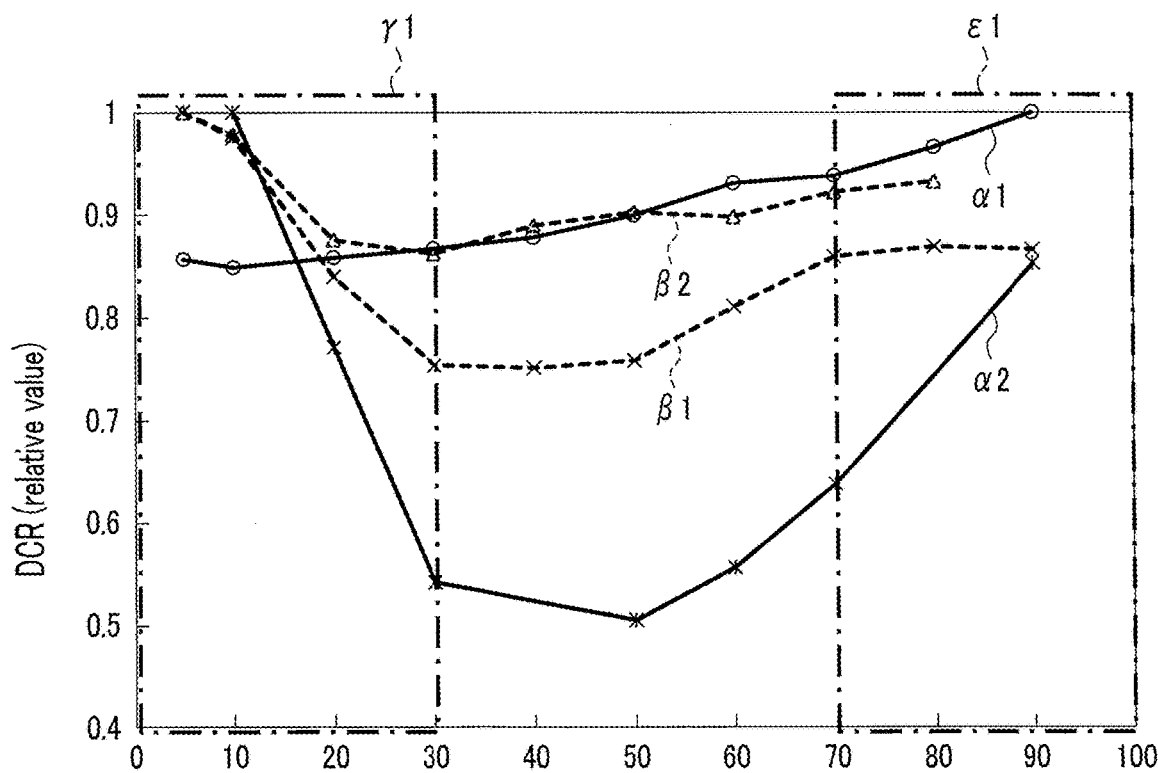
F I G. 2

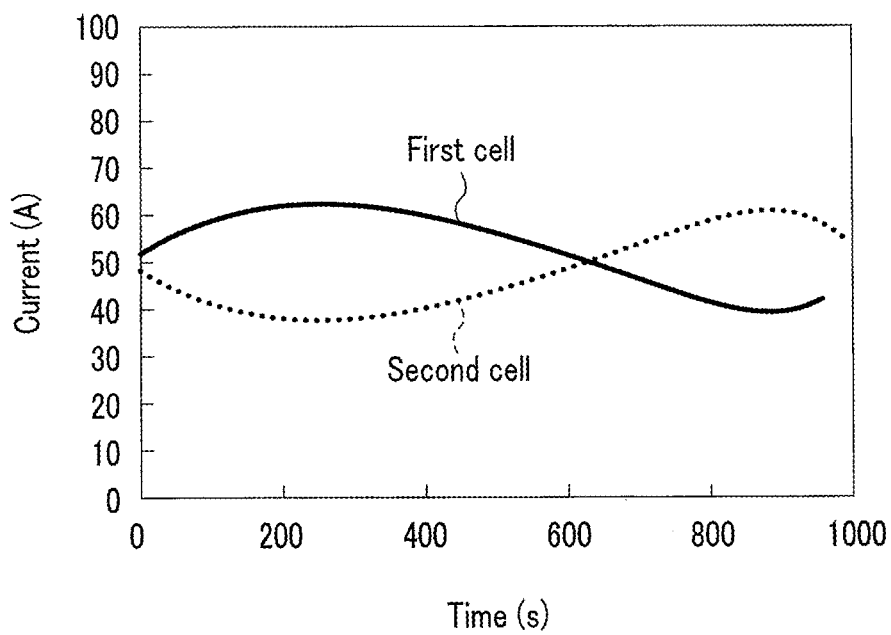
F I G. 11
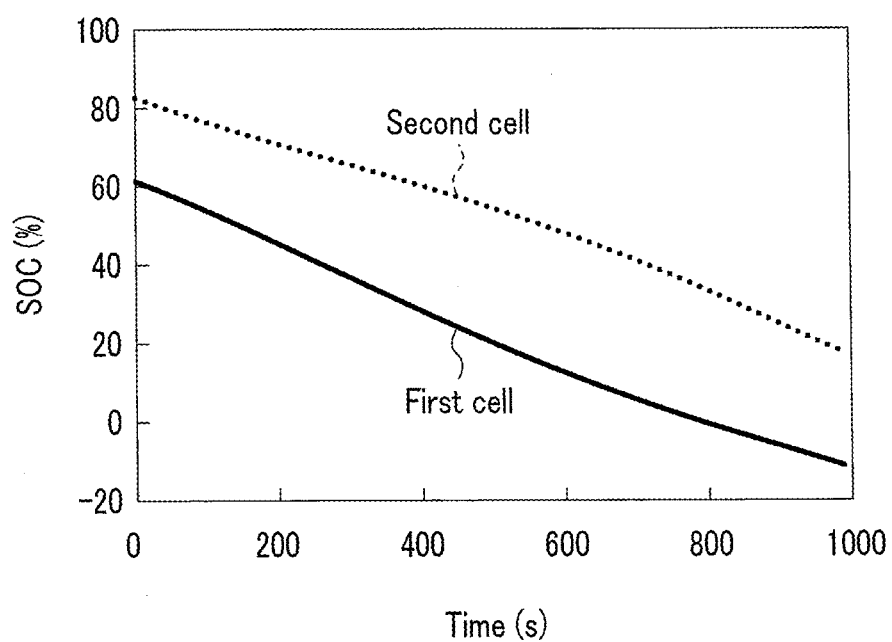
F I G. 12

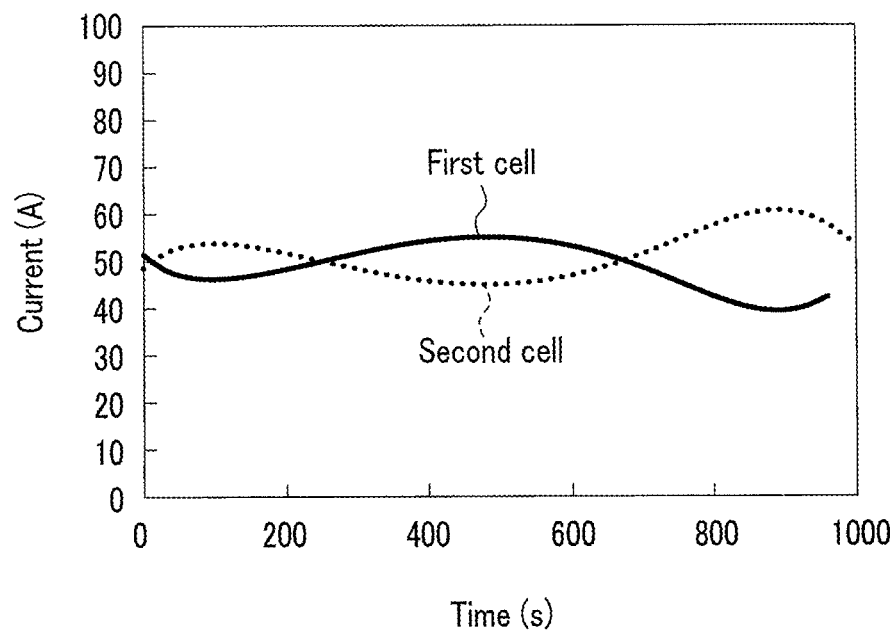
F I G. 13
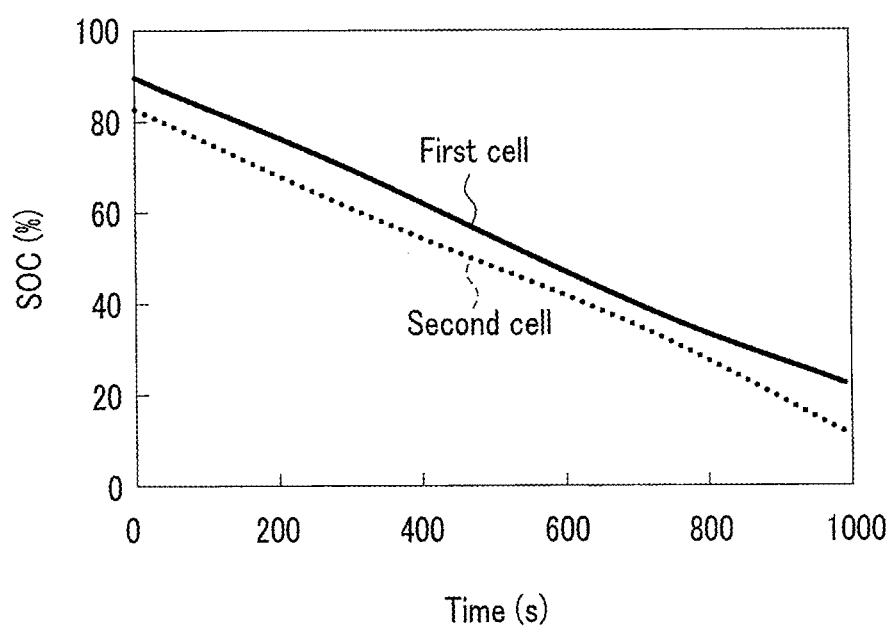
F I G. 14

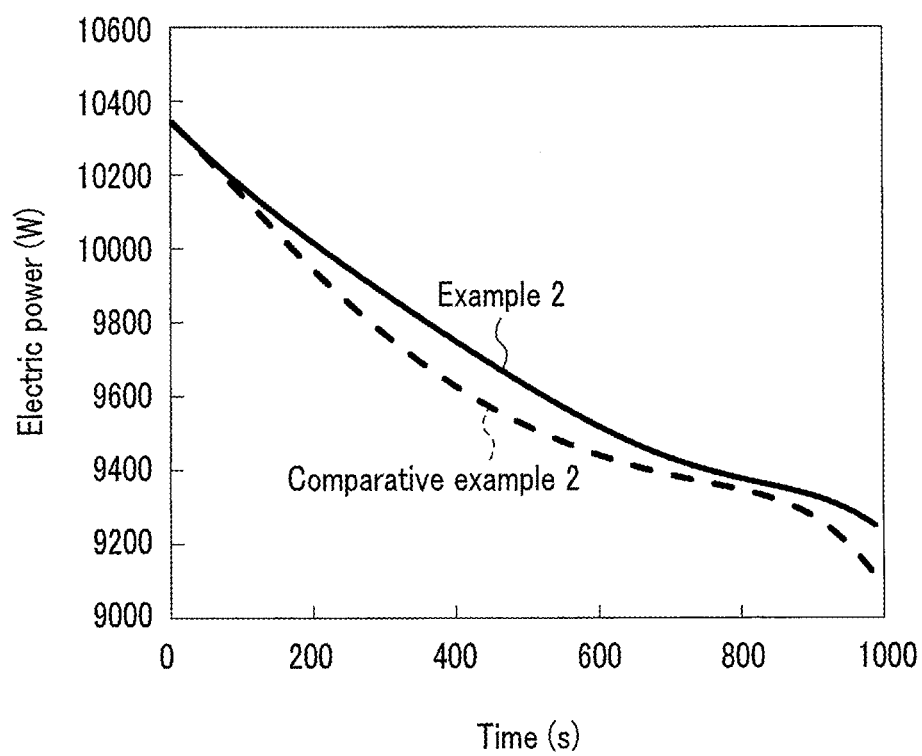
F I G. 15

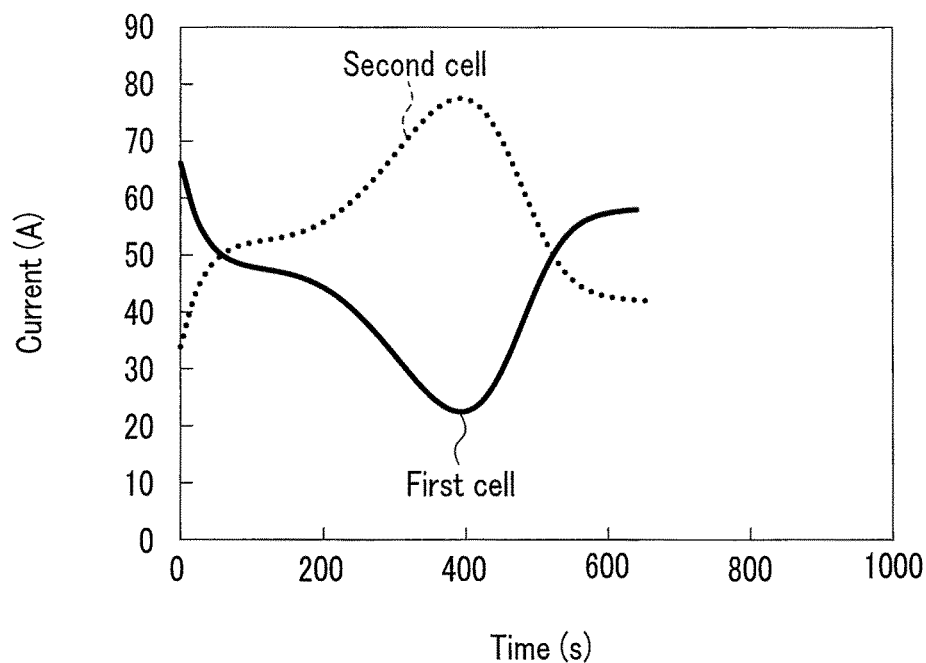
F I G. 20
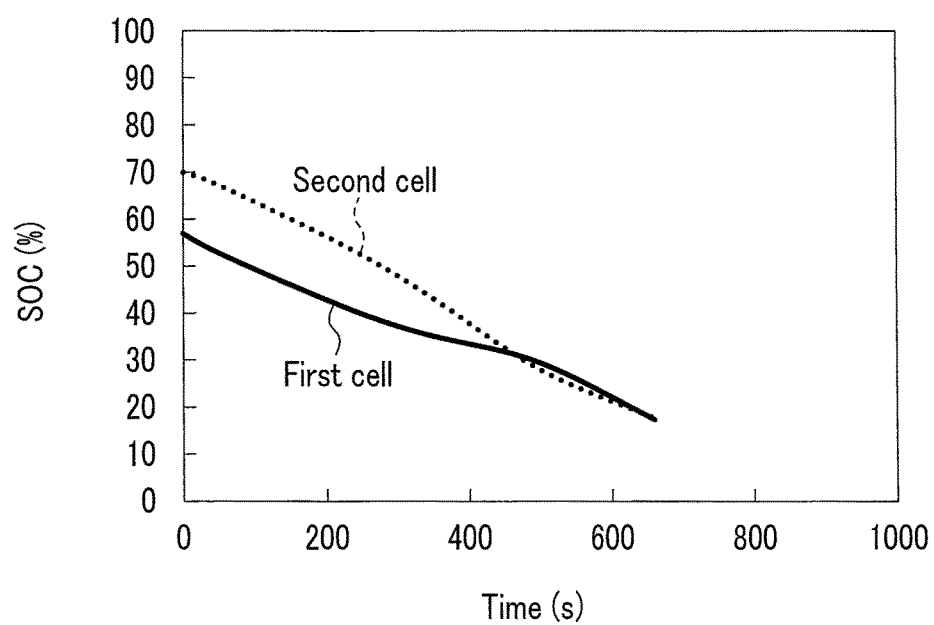
F I G. 21

STORAGE BATTERY

CROSS-REFERENCE TO RELATED APPLICATIONS

This is a Continuation Application of PCT Application No. PCT/JP2021/003748, filed Feb. 2, 2021 and based upon and claiming the benefit of priority from prior Japanese Patent Application No. 2020-125399, filed Jul. 22, 2020, the entire contents of which are incorporated herein by reference.

FIELD

Embodiments described herein relate to a storage battery.

BACKGROUND

Storage batteries are widely used as power sources for small portable devices, power sources mounted on vehicles in the field of mobility, stationary power sources in power transmission networks such as smart grids, and the like. In such a storage battery, especially when the storage battery is used as a power source for a vehicle, it is required to realize a long life by, for example, ensuring safety in charging or discharging with a large current and to secure a high energy density.

A storage battery formed from a nonaqueous electrolyte cell containing a titanium composite oxide as a negative electrode active material has high safety in charging or discharging with a large current. On the other hand, a storage battery formed from a nonaqueous electrolyte cell containing a carbonaceous material as a negative electrode active material has high energy density. The storage battery is required to ensure both safety in charging or discharging with a large current and high energy density by, for example, combining two or more types of cells in which materials as active materials are different from each other.

BRIEF DESCRIPTION OF THE DRAWINGS

FIG. 1 is a schematic diagram showing a configuration of a battery pack according to a first embodiment.

FIG. 2 is a schematic diagram showing a relationship of DC resistance during charging to SOC for each of a first cell and a second cell of an embodiment.

FIG. 11 is a schematic diagram showing a change over time in a current flowing through each of the first cell and the second cell in discharging from an initial voltage value of the battery pack in Example 2.

FIG. 12 is a schematic diagram showing a change over time in the SOC of each of the first cell and the second cell in discharging from the initial voltage value of the battery pack in Example 2.

FIG. 13 is a schematic diagram showing a change over time in a current flowing through each of the first cell and the second cell in discharging from an initial voltage value of the battery pack in Comparative Example 2.

FIG. 14 is a schematic diagram showing a change over time in the SOC of each of the first cell and the second cell in discharging from the initial voltage value of the battery pack in Comparative Example 2.

FIG. 15 is a schematic diagram showing a change over time in an output power of the battery pack in discharging from the initial voltage value of each of the battery packs of Example 2 and Comparative Example 2.

FIG. 20 is a schematic diagram showing a change over time in the current flowing through each of the first cell and the second cell in discharging from an initial voltage value of the battery pack in Example 3.

FIG. 21 is a schematic diagram showing a change over time in the SOC of each of the first cell and the second cell in discharging from the initial voltage value of the battery pack in Example 3.

DETAILED DESCRIPTION

Figure 3:
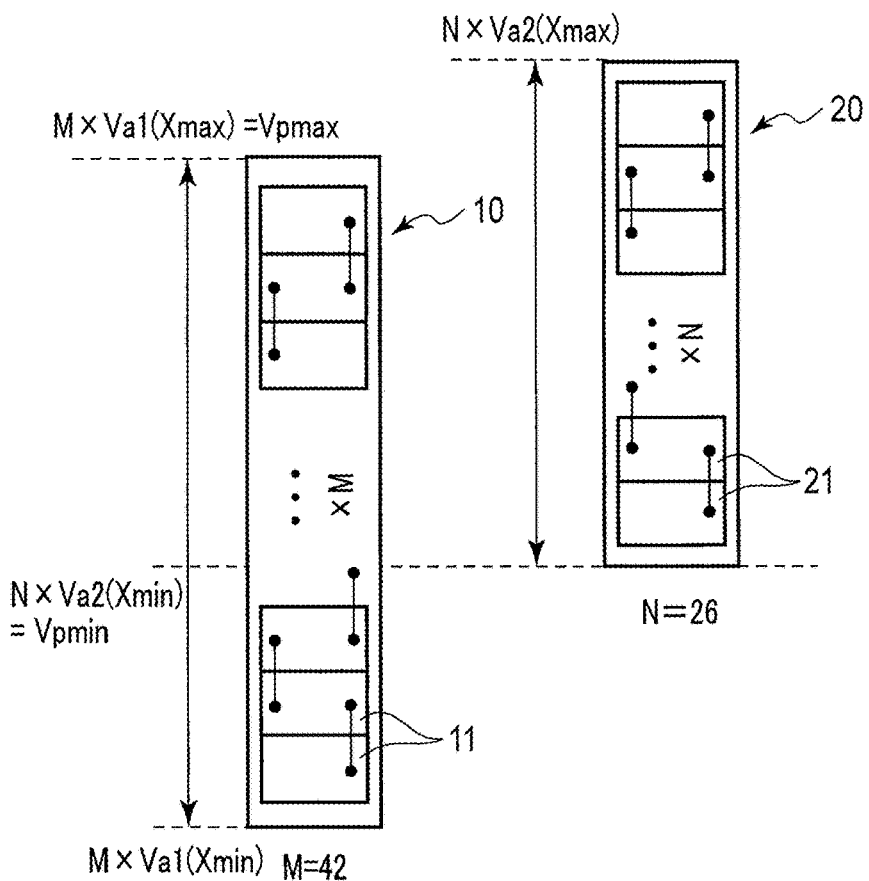
FIG. 3 is a schematic diagram showing a configuration and a voltage range of each of a first battery module and a second battery module in Example 1 (Comparative Example 2).

According to one embodiment, a storage battery includes a first battery module and a second battery module. The first battery module includes a plurality of first cells connected in series, and each of the plurality of first cells includes a titanium composite oxide as a negative electrode active material. The second battery module includes a plurality of second cells connected in series, and each of the plurality of second cells includes a carbonaceous material as a negative electrode active material. The second battery module is connected in parallel with the first battery module. Assuming that an open circuit voltage at SOC=X % of each of the plurality of first cells is Va1 (X), the open circuit voltage at SOC=X % of each of the plurality of second cells is Va2 (X), the number of the plurality of first cells connected in series in the first battery module is M, and the number of the plurality of second cells connected in series in the second battery module is N, M×Va1 (X)<N×Va2 (X) is satisfied in 0≤X≤30, and M×Va1 (X)>N×Va2 (X) is satisfied in 70≤X≤100.

Hereinafter, embodiments will be described with reference to the drawings.

First Embodiment

FIG. 1 is a schematic diagram showing a configuration of a battery pack according to a first embodiment. A battery pack 1 includes a storage battery 2. The storage battery 2 includes a first battery module 10 and a second battery module 20. The first battery module 10 includes a plurality of first cells 11, and the plurality of first cells 11 are electrically connected in series. In the present embodiment, the first battery module 10 is provided with the M first cells 11, and the number of the first cells connected in series in the first battery module 10 is M. Each of the first cells 11 is a nonaqueous electrolyte cell in which a titanium composite oxide is used as a negative electrode active material.

The second battery module 20 includes a plurality of second cells 21, and the plurality of second cells 21 are electrically connected in series. In the present embodiment, the second battery module 20 is provided with the N second cells 21, and the number of the second cells connected in series in the second battery module 20 is N. Each of the second cells 21 is a nonaqueous electrolyte cell in which a carbonaceous material is used as a negative electrode active material. The battery pack 1 is provided with a cooler 5 that cools the first battery module 10 and the second battery module 20.

Examples of the titanium composite oxide used as the negative electrode active material in each of the plurality of first cells 11 of the first battery module 10 include monoclinic niobium titanium composite oxide, orthorhombic titanium-containing composite oxide, lithium titanate having a ramsdellite structure, lithium titanate having a spinel structure, monoclinic titanium dioxide, anatase type titanium dioxide, rutile type titanium dioxide, and hollandite type titanium composite oxide.

In each of the plurality of first cells 11, a lithium transition metal composite oxide can be used as a positive electrode active material. Examples of the lithium transition metal composite oxide used as the positive electrode active material in each of the plurality of first cells 11 include $Li_uMeO_2$ (0<u≤1, and Me is one or more selected from the group consisting of Ni, Co, and Mn) having a layered structure, and, for example, a lithium nickel cobalt manganese composite oxide can be used. Examples of the lithium transition metal composite oxide used as the positive electrode active material in each of the plurality of first cells 11 further include lithium iron phosphorus oxide. As the negative electrode active material and the positive electrode active material used in the plurality of first cells 11, the same active material as in a reference literature 1 (International Publication No. 2019/187132) can be used.

The first battery module 10 is constituted of a group of cells in which the plurality of first cells 11 are connected in series. In the first battery module 10, the capacities, sizes, weights, etc. of the plurality of first cells 11 are the same or almost the same as each other. Furthermore, in the first battery module 10, the plurality of first cells 11 are electrically connected to each other via a bus bar 13. If a voltage V1 of the first cell 11 alone is specified, the voltage of the first battery module 10 is V1×M.

Examples of the carbonaceous material used as the negative electrode active material in each of the plurality of second cells 21 of the second battery module 20 include graphite and amorphous carbon. In each of the plurality of second cells 21, an active material similar to the positive electrode active material of the first cell 11 can be used as the positive electrode active material.

The second battery module 20 is constituted of a group of cells in which the plurality of second cells 21 are connected in series. In the second battery module 20, the capacities, sizes, weights, etc. of the plurality of second cells 21 are the same or substantially the same as each other. Furthermore, in the second battery module 20, the plurality of second cells 21 are electrically connected to each other via a bus bar 23. If a voltage V2 of the second cell 21 alone is specified, the voltage of the second battery module 20 is V2×N.

In the storage battery 2, the second battery module 20 is electrically connected in parallel with the first battery module 10. The storage battery 2 is electrically connected to an external power source or an external load outside the battery pack 1. When the storage battery 2 is electrically connected to the external power source or the external load, a positive electrode side terminal 15 of the first battery module 10 and a positive electrode side terminal 25 of the second battery module 20 are each connected to a plus side terminal 7 of the external power source or the external load. When the storage battery 2 is electrically connected to the external power source or the external load, a negative electrode side terminal 16 of the first battery module 10 and a negative electrode side terminal 26 of the second battery module 20 are each connected to a minus side terminal 8 of the external power source or the external load.

As the cooler 5, an air cooling fan, a cooling pump, or the like can be used. The cooler 5 supplies a cooling medium to a flow path 6 and causes the cooling medium to flow through the flow path 6. The cooling medium is air or liquid. The first battery module 10 and the second battery module 20 are cooled by the cooling medium flowing through the flow path 6. The flow path 6 is adjacent to the second battery module 20, and heat generated in the second battery module 20 is released to the cooling medium flowing through the flow path 6. The first battery module 10 is disposed on a side opposite to the flow path 6 with respect to the second battery module 20. Heat generated in the first battery module 10 is released to the cooling medium flowing through the flow path 6 through the second battery module 20.

Next, a method of operating the battery pack 1 (storage battery 2) of the present embodiment will be described. The following description of the operation method will be described with reference to FIGS. 3 and 4 related to Example 1 described later. Here, in the first cell 11 alone which is a nonaqueous electrolyte cell in which a titanium composite oxide is used as the negative electrode active material, an open circuit voltage Va1 (X) in a state where the SOC (State of charge) is X % (SOC=X %) is defined. In the second cell 21 alone which is a nonaqueous electrolyte cell in which a carbonaceous material is used as the negative electrode active material, an open circuit voltage Va2 (X) in the state where the SOC is X % (SOC=X %) is defined. In each of the cells 11 and 21, a state where the SOC is 100% (state where X=100) is a fully charged state, and a state where the SOC is 0% (state where X=0) is a fully discharged state. Furthermore, in each of the cells 11 and 21, the SOC is a ratio of a charge amount (remaining capacity to the fully discharged state) from the fully discharged state to a maximum capacity (fully charged capacity from the fully discharged state to the fully charged state).

When values of the SOCs of the first cell 11 and the second cell 21 are the same, a negative electrode potential of the first cell 11 is higher than the negative electrode potential of the second cell 21. Thus, when the values of the SOCs of the cell 11 and the cell 21 are the same, the open circuit voltage of the first cell 11 alone is lower than the open circuit voltage of the second cell 21 alone. That is, a relationship of Va1 (X)<Va2 (X) is established. Actually, as the first cell 11, a cell having an open circuit voltage Va1 (0) in a range of 1.2 V to 3.2 V at SOC=0% is used. As the second cell 21, a cell having an open circuit voltage Va2 (0) in a range of 2.5 V to 4.3 V at SOC=0% is used.

When SOC=X %, the open circuit voltage of the first battery module 10 is M×Va1 (X) by using the number M of the first cells 11 connected in series in the first battery module 10. Furthermore, when SOC=X %, the open circuit voltage of the second battery module 20 is N×Va2 (X) by using the number N of the second cells 21 connected in series in the second battery module 20.

In the battery pack 1 of the present embodiment, since the battery modules 10 and 20 are connected in parallel, the voltages of the battery modules 10 and 20 are the same or substantially the same as each other during the operation of the battery pack 1. Further, in the battery pack 1 (storage battery 2), a lower limit voltage value Vpmin is set. The lower limit voltage value Vpmin of the battery pack 1 (storage battery 2) is set to the higher one of the lower limit voltage value of the first battery module 10 and the lower limit voltage value of the second battery module 20 from the viewpoint of ensuring safety and durability. Furthermore, in the battery pack 1, for example, at the start of charging and immediately after the start of charging, etc., it is necessary to suppress flow of a large current through each of the second cells 21 containing a carbonaceous material as the negative electrode active material, and prevent precipitation of lithium in each of the second cells 21. Thus, in the present embodiment, when the storage battery 2 is charged such that the lower limit voltage value Vpmin or a value slightly higher than the lower limit voltage value Vpmin is set as an initial voltage value, the battery pack 1 is operated under a condition that resistance of the second cell 21 is higher than resistance of the first cell 11 at the start of charging and immediately after the start of charging, etc. As a result, it is suppressed that a large current is rapidly input to each of the second cells 21 at the start of charging and immediately after the start of charging, etc.

In order to operate the battery pack 1 under the above-mentioned conditions, in the present embodiment, the number M of the first cells 11 connected in series in the first battery module 10 and the number N of the second cells 21 connected in series in the second battery module 20 are set so as to satisfy a formula (A1) in a range where the SOC of each of the first cell 11 and the second cell 21 is 0% to 30%. Thus, if the SOCs of the first battery module 10 and the second battery module 20 are the same at any value in the range of 0% to 30%, the voltage of the second battery module 20 is higher than the voltage of the first battery module 10. If the voltages of the battery modules 10 and 20 are the same at either the lower limit voltage value Vpmin of the battery pack 1 described above or the value slightly higher than the lower limit voltage value Vpmin, the SOC of the second battery module 20 is lower than the SOC of the first battery module 10.

$$M \times Va1(X) < N \times Va2(X)(0 \leq X \leq 30) \quad (A1)$$

In each of the first cell 11 and the second cell 21, the voltage when the SOC is Xmin % is defined as the lower limit voltage value. Here, Xmin indicates a lower limit SOC of each of the cells 11 and 21, and is any value of 0 to 30. A lower limit voltage value M×Va1 (Xmin) of the first battery module 10 is defined from a lower limit voltage value Va1 (Xmin) of the first cell 11, and a lower limit voltage value N×Va2 (Xmin) of the second battery module 20 is defined from a lower limit voltage value Va2 (Xmin) of the second cell 21.

As described above, the lower limit voltage value Vpmin of the battery pack 1 (storage battery 2) is set to the higher one of the lower limit voltage value M×Va1 (Xmin) of the first battery module 10 and the lower limit voltage value N×Va2 (Xmin) of the second battery module 20. From the equation (A1), the lower limit voltage value N×Va2 (Xmin) of the second battery module 20 is higher than the lower limit voltage value M×Va1 (Xmin) of the first battery module 10. That is, if the SOCs of the first battery module 10 and the second battery module 20 are the same at Xmin % which is the lower limit SOC, the voltage of the second battery module 20 is higher than the voltage of the first battery module 10. Therefore, in the present embodiment, the lower limit voltage value N×Va2 (Xmin) of the second battery module 20 is set as the lower limit voltage value Vpmin of the battery pack 1, and the battery pack 1 (storage battery 2) is operated in a state where the voltage is the lower limit voltage value N×Va2 (Xmin) of the second battery module 20 or more.

FIG. 2 is a schematic diagram showing a relationship of DC resistance (DCR: direct current resistance) during charging to SOC for each of the first cell and the second cell of the embodiment. In FIG. 2, the abscissa axis shows the SOC of a single cell, and the ordinate axis shows the DC resistance of a single cell. When lithium titanate is used as the negative electrode active material, a change in DC resistance of the first cell 11 is shown by a change pattern α1. When niobium-titanium composite oxide is used as the negative electrode active material, a change in DC resistance of the first cell 11 is shown by a change pattern α2. When graphite is used as the negative electrode active material and lithium nickel cobalt manganese composite oxide is used as the positive electrode active material, a change in DC resistance of the second cell 21 is shown by a change pattern β1. When graphite is used as the negative electrode active material and lithium iron phosphorus oxide is used as the positive electrode active material, a change in DC resistance of the second cell 21 is shown by a change pattern β2. Furthermore, in FIG. 2, in each of the change patterns α1, α2, β1, and β2, the DC resistance is shown by a relative value at which a value at a measurement point having the highest DC resistance among the plurality of measurement points is 1. The DC resistance during charging can be determined by a hybrid pulse power characterization (HPPC) test, and FIG. 2 shows a measurement result at 25° C.

As shown in FIG. 2, the relationship of the DC resistance to the SOC in a single cell varies depending on the types of the negative electrode active material and the positive electrode active material, the capacities of the negative electrode active material and the positive electrode active material, and the like. However, in many types of cells, the resistance tends to be high in the range where the SOC is 0% to 30%

(range γ1 in FIG. 2), that is, in a region where the SOC is low. That is, in many types of cells, the resistance tends to be higher in the range where the SOC is 0% to 30% than the resistance in a range where the SOC is 30% to 70%. A reason why the resistance of the cell is high in the region where the SOC is low is considered to be that diffusion resistance is high because a lithium filled state (filling rate) at the positive electrode is high in the region where the SOC is low.

In the present embodiment, the battery pack 1 is charged with the lower limit voltage value Vpmin as the initial voltage value, for example. In this case, at the start of charging and immediately after the start of charging, the voltages of the battery modules 10 and 20 are the same or substantially the same as each other at either the lower limit voltage value Vpmin or the value slightly higher than the lower limit voltage value Vpmin. Thus, at the start of charging and immediately after the start of charging, the SOC of the second battery module 20 is lower than the SOC of the first battery module 10, and the SOC of the second cell 21 containing a carbonaceous material as the negative electrode active material is lower than the SOC of the first cell 11 containing titanium composite oxide as the negative electrode active material. Since Xmin is 0 to 30, the SOC of the second battery module 20 (second cell 21) is in a low region, such as the range of 0% to 30%, at the start of charging and immediately after the start of charging.

Here, from a relationship of the resistance to the SOC in the cell alone shown in FIG. 2, when the battery pack 1 is operated as described above, at the start of charging the battery pack 1 and immediately after the start of the charging, the resistance of the first cell 11, that is, the resistance of the first battery module 10 is low. At the start of charging the battery pack 1 and immediately after the start of the charging, the resistance of the second cell 21 is higher than the resistance of the first cell 11, and the resistance of the second battery module 20 is higher than the resistance of the first battery module 10. As a result, even when the battery pack 1 is rapidly charged with a large current with the lower limit voltage value Vpmin or the like as the initial voltage value, a large current is input only to the first battery module 10 at the start of charging and immediately after the start of charging, etc. Since the input of a large current to the second battery module 20 is suppressed, precipitation of lithium at each negative electrode of the second cell 21 is effectively prevented. Therefore, the safety of the storage battery 2 (battery pack 1) is ensured in the charging with a large current, and the durability of the battery pack 1 is ensured.

Figure 4:
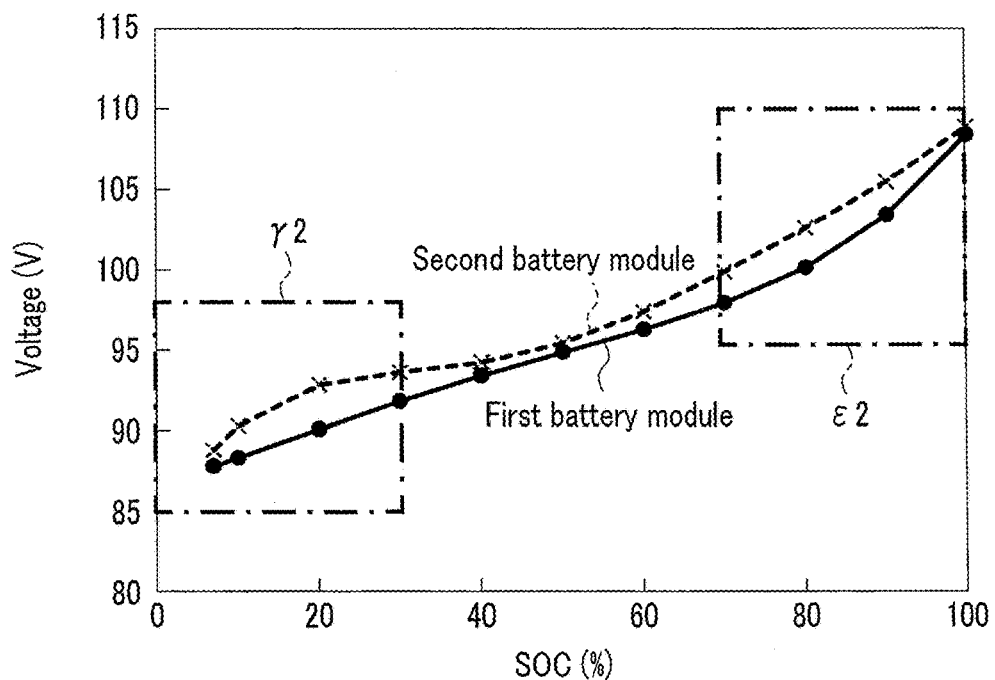
FIG. 4 is a schematic diagram showing a relationship of a voltage to SOC for each of the first battery module and the second battery module in Example 1 (Comparative Example 2).

Hereinafter, Example 1 which is an example of the present embodiment will be described. FIG. 3 is a schematic diagram showing a configuration and a voltage range of each of the first battery module and the second battery module in Example 1. FIG. 4 is a schematic diagram showing a relationship of the voltage to the SOC for each of the first battery module and the second battery module in Example 1. In FIG. 4, the abscissa axis shows each SOC of the battery module, and the ordinate axis shows the voltage of the battery module. Furthermore, in FIG. 4, a change in a voltage M×V1 of the first battery module 10 is shown by a solid line, and a change in a voltage N×V2 of the second battery module 20 is shown by a broken line.

As shown in FIG. 3, etc., in Example 1, the 42 first cells 11 were electrically connected in series to form the first battery module 10 in which the number of the first cells 11 connected in series was 42 (M=42), and the 26 second cells 21 were electrically connected in series to form the second battery module 20 in which the number of the second cells 21 connected in series was 26 (N=26). The storage battery 2 (battery pack 1) was formed by electrically connecting the first battery module 10 and the second battery module 20 in parallel. As the first cell 11, a nonaqueous electrolyte cell containing lithium titanate, having a spinel structure, as a negative electrode active material and having a capacity (fully charged capacity) of 20 Ah was used. As the second cell 21, a nonaqueous electrolyte cell containing graphite as the negative electrode active material and having a capacity (fully charged capacity) of 20 Ah was used.

In Example 1, the lower limit SOC was set to 10% (Xmin=10) in each of the first cell 11 and the second cell 21. The lower limit voltage value of the first cell 11 was set to 2.10 V, which was an open circuit voltage Va1 (10) of the first cell 11 at SOC=10%. The lower limit voltage value of the second cell 21 was set to 3.47 V, which was an open circuit voltage Va2 (10) of the second cell 21 at SOC=10%. Thus, the lower limit voltage value of the first battery module 10 in which the 42 first cells 11 were connected in series was set to 88.3 V, and the lower limit voltage value of the second battery module 20 in which the 26 second cells 21 were connected in series was set to 90.3 V. Therefore, in Example 1, when the SOCs of the battery modules 10 and 20 were the same at Xmin % which was the lower limit SOC, the voltage of the second battery module 20 was higher than the voltage of the first battery module 10. Furthermore, in Example 1, the condition of the above formula (A1) was satisfied in the range where the SOC was 0% to 30%, that is, in the region where the SOC was low (see range γ2 in FIG. 4).

Figure 5:
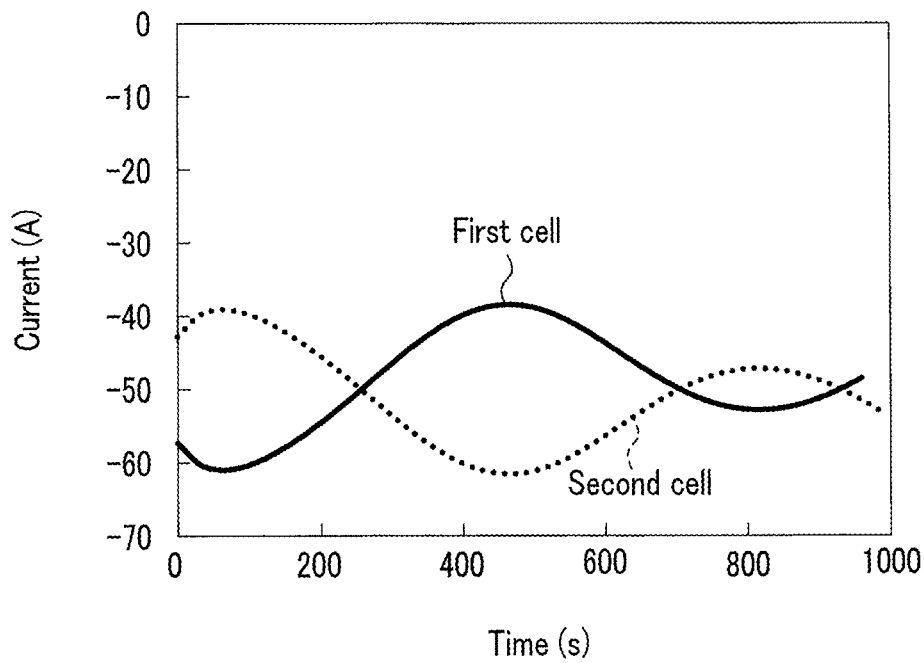
FIG. 5 is a schematic diagram showing a change over time in a current flowing through each of the first cell and the second cell in charging from a lower limit voltage value of the battery pack in Example 1.
Figure 6:
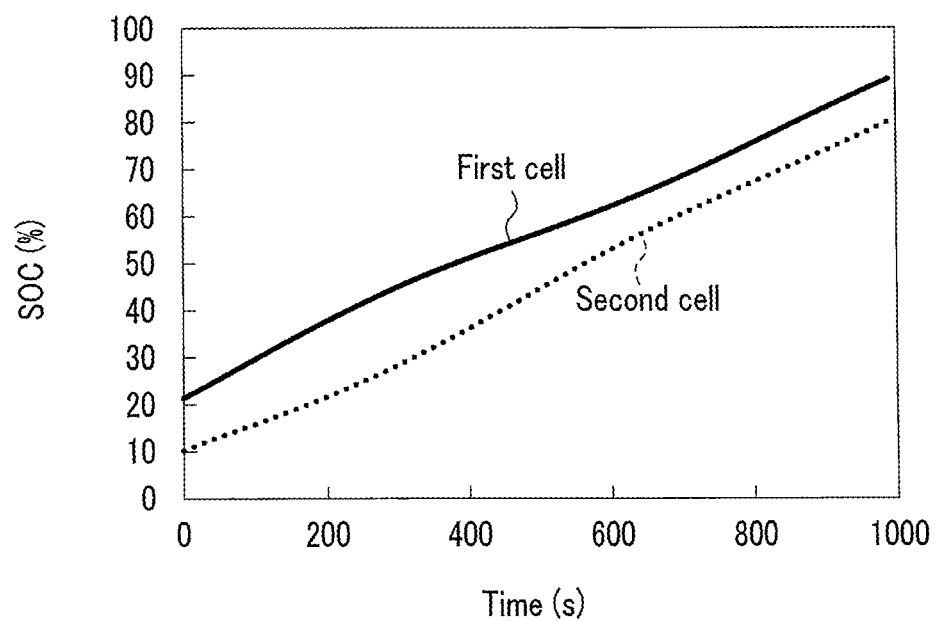
FIG. 6 is a schematic diagram showing a change over time in the SOC of each of the first cell and the second cell in charging from the lower limit voltage value of the battery pack in Example 1.

In Example 1, the battery pack 1 was operated with a lower limit voltage value N×Va2 (10) of the second battery module 20 as the lower limit voltage value Vpmin of the battery pack 1. Furthermore, in Example 1, a current of 100 A was input to the battery pack 1, and the battery pack 1 was charged at a constant current from the lower limit voltage value Vpmin. That is, charging was started with the lower limit voltage value Vpmin as the initial voltage value. FIG. 5 is a schematic diagram showing a change over time in the current flowing through each of the first cell and the second cell in charging from the lower limit voltage value of the battery pack in Example 1. FIG. 6 is a schematic diagram showing a change over time in the SOC of each of the first cell and the second cell in charging from the lower limit voltage value of the battery pack in Example 1. In FIGS. 5 and 6, the abscissa axis shows the time when the start time of charging is 0. In FIG. 5, the ordinate axis shows the current, and in FIG. 6, the ordinate axis shows the SOC. In FIG. 5, the current for charging the battery pack 1 is shown as a negative value. Furthermore, in FIGS. 5 and 6, a change of a parameter related to the first cell 11 is shown by a solid line, and a change of a parameter related to the second cell 21 is shown by broken line.

As shown in FIGS. 5, 6, etc., in the charging of the battery pack 1 of Example 1, at the start of charging and immediately after the start of charging, that is, while about 200 seconds had passed since the start of charging, a large current flowed through the first cell 11, and input of a large current to the second cell 21 was suppressed. Furthermore, in the charging of the battery pack 1 of Example 1, the SOC of the second cell 21 was lower than the SOC of the first cell 11 including at the start of charging and immediately after the start of charging. When a certain amount of time had passed since the start of charging, the current flowing through the second cell 21 increased in response to an increase in the SOC of the first cell 11 to some extent.

In the battery pack 1 of the present embodiment including Example 1, when the SOCs of the first battery module 10 and the second battery module 20 are the same at Xmin % (Xmin is any value of 0 to 30) which is the lower limit SOC, the voltage of the second battery module 20 is higher than the voltage of the first battery module 10. That is, the condition of the above formula (A1) is satisfied in the range where the SOC is 0% to 30%. Thus, in the present embodiment, when charging is performed such that the lower limit voltage value Vpmin (N×Va2 (Xmin) in the present embodiment) or a value slightly higher than the lower limit voltage value Vpmin is set as an initial voltage value, the SOC of the second battery module 20 (second cell 21) is in a low region such as the range of 0% to 30% at the start of charging and immediately after the start of charging. At the start of charging and immediately after the start of charging, charging is performed in a state where the SOC of the first battery module 10 (first cell 11) is higher than the SOC of the second battery module 20. Thus, the resistance of the second battery module 20 is higher than the resistance of the first battery module 10 at the start of charging and immediately after the start of charging.

Since the resistance of the second battery module 20 is higher than the resistance of the first battery module 10, it is suppressed that a large current flows through each of the second cells 21 at the start of charging and immediately after the start of charging. As a result, even when the second battery module 20 is disposed in a low temperature environment, precipitation of lithium in each of the second cells 21 is effectively prevented. Therefore, the safety of the storage battery 2 (battery pack 1) is ensured in the charging with a large current, and the durability of the battery pack 1 is ensured. Since the resistance of the first battery module 10 is low at the start of charging and immediately after the start of charging, a large current flows through each of the first cells 11. Therefore, the battery pack 1 can be charged with a large current while ensuring safety and the like, and the input characteristics of the storage battery 2 are ensured.

In the present embodiment, by arranging the battery modules 10 and 20 and the flow path 6 as shown in FIG. 1, the heat generated in the first battery module 10 is transferred to the second battery module 20. As a result, when charging of the battery pack 1 is started, the temperature of the second battery module 20 rises rapidly. Therefore, it is possible to increase the current flowing through the second cell 21 at an early stage after the start of charging while ensuring the safety of the battery pack 1.

In the present embodiment, since the second battery module 20 is formed from the second cell 21 containing a carbonaceous material as the negative electrode active material, an energy density of the second battery module 20 is high. The storage battery 2 is formed by connecting the second battery module 20 in parallel with the first battery module 10. Therefore, in the storage battery 2 (battery pack 1) of the present embodiment, both safety in charging with a large current and high energy density are ensured.

Figure 7:
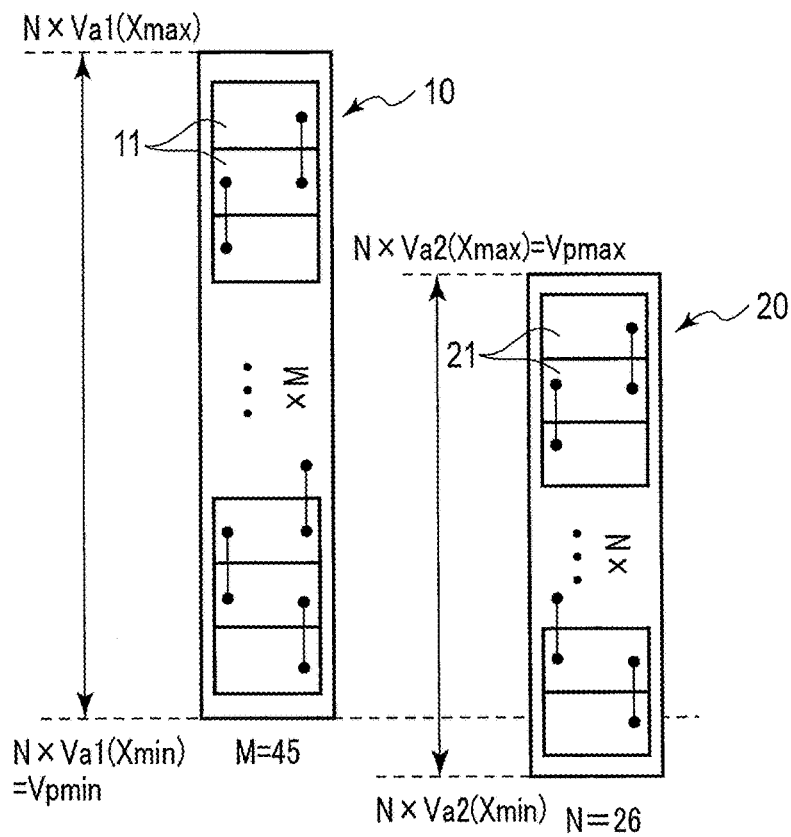
FIG. 7 is a schematic diagram showing a configuration and a voltage range of each of the first battery module and the second battery module in Comparative Example 1 (Example 2).
Figure 8:
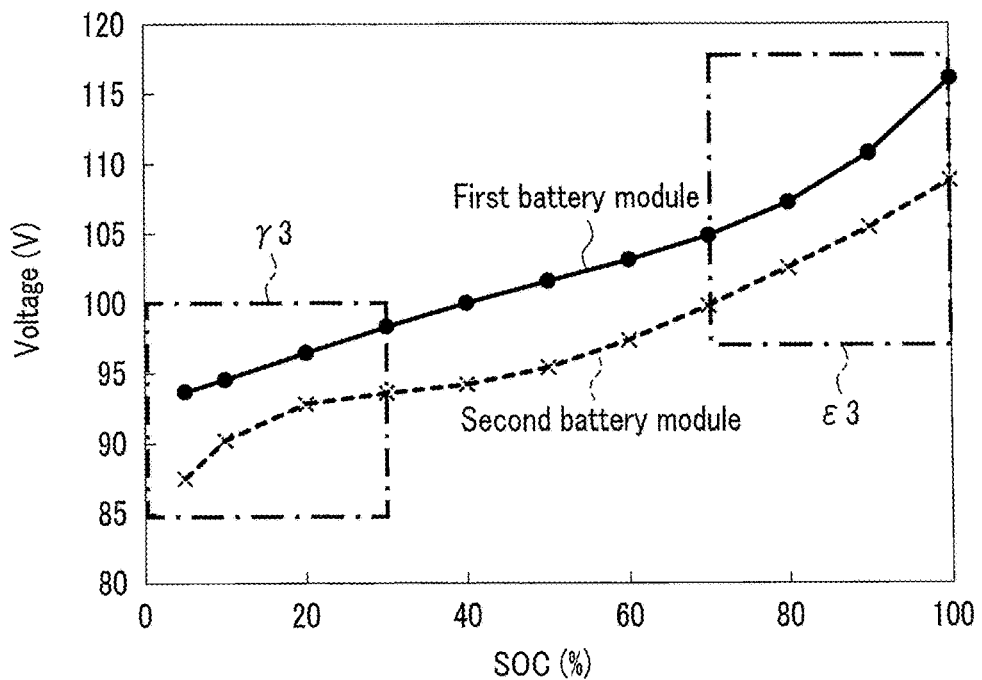
FIG. 8 is a schematic diagram showing a relationship of the voltage to the SOC for each of the first battery module and the second battery module in Comparative Example 1 (Example 2).

Here, Comparative Example 1 will be described as a comparative example of the present embodiment. FIG. 7 is a schematic diagram showing a configuration and a voltage range of each of the first battery module and the second battery module in Comparative Example 1. FIG. 8 is a schematic diagram showing a relationship of the voltage to the SOC for each of the first battery module and the second battery module in Comparative Example 1. In FIG. 8, the abscissa axis shows the SOC of the battery module, and the ordinate axis shows the voltage of the battery module. Furthermore, in FIG. 8, a change in the voltage M×V1 of the first battery module 10 is shown by a solid line, and a change in the voltage N×V2 of the second battery module 20 is shown by a broken line.

As shown in FIG. 7, etc., in Comparative Example 1, the first battery module 10 in which the number of the first cells 11 connected in series was 45 (M=45) was formed. In the second battery module 20, the number of the second cells 21 connected in series was 26 (N=26) as in Example 1. As in Example 1, the storage battery 2 (battery pack 1) was formed by connecting the battery modules 10 and 20 in parallel. As each of the first cell 11 and the second cell 21, the same nonaqueous electrolyte cell as in Example 1 was used.

In Comparative Example 1, the lower limit SOC was set to 10% (Xmin=10) in each of the cells 11 and 21 as in Example 1. The lower limit voltage value of the first cell 11 was set to 2.10 V, which was the open circuit voltage Va1 (10) of the first cell 11 at SOC=10%, and the lower limit voltage value of the second cell 21 was set to 3.47 V, which was the open circuit voltage Va2 (10) of the second cell 21 at SOC=10%. However, in Comparative Example 1, since the number of the first cells 11 connected in series in the first battery module 10 was 45, the lower limit voltage value of the first battery module 10 was set to 92.5 V. The lower limit voltage value of the second battery module 20 was set to 90.3 V as in Example 1. Therefore, in Comparative Example 1, when the SOCs of the battery modules 10 and 20 were the same at Xmin % which was the lower limit SOC, the voltage of the second battery module 20 was lower than the voltage of the first battery module 10. Furthermore, in Comparative Example 1, the condition of the above formula (A1) was not satisfied in the range where the SOC was 0% to 30%, that is, in the region where the SOC was low (see range γ3 in FIG. 8).

Figure 9:
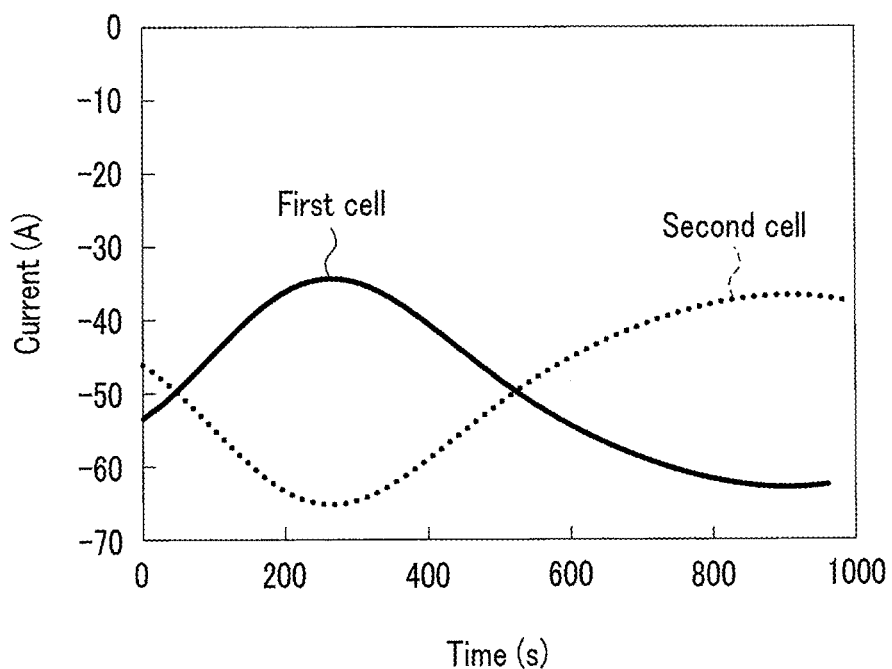
FIG. 9 is a schematic diagram showing a change over time in a current flowing through each of the first cell and the second cell in charging from an initial voltage value of the battery pack in Comparative Example 1.
Figure 10:
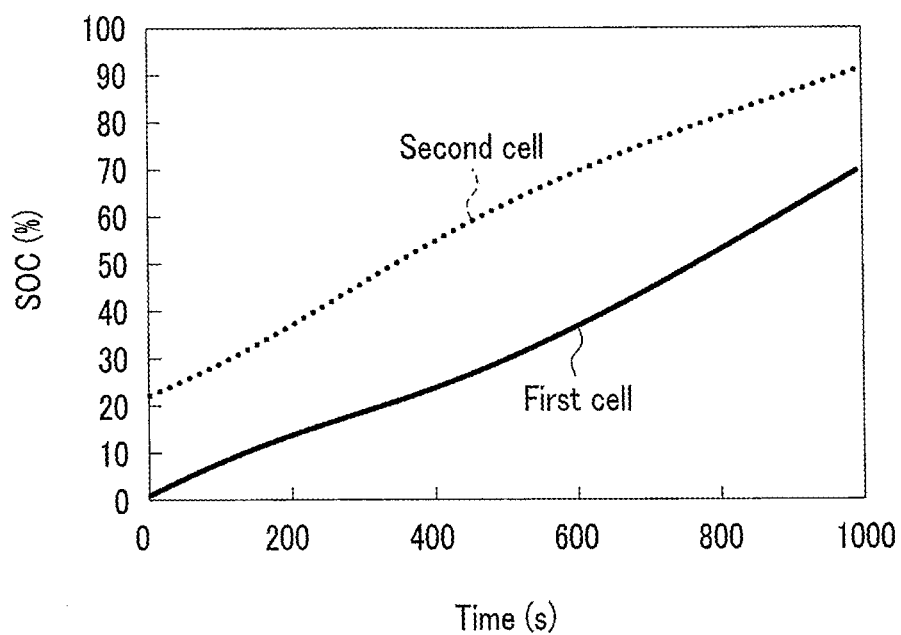
FIG. 10 is a schematic diagram showing a change over time in the SOC of each of the first cell and the second cell in charging from the initial voltage value of the battery pack in Comparative Example 1.

In Comparative Example 1, the battery pack 1 was operated with a lower limit voltage value N×Va1 (10) of the first battery module 10 as the lower limit voltage value Vpmin of the battery pack 1. Then, a current of 100 A was input to the battery pack 1, and the battery pack 1 was charged with a constant current. At that time, charging was performed from a state where the open circuit voltage of the battery pack 1 was 93.1 V, that is, from an initial voltage value of 93.1 V. FIG. 9 is a schematic diagram showing a change over time in a current flowing through each of the first cell and the second cell in charging from an initial voltage value of the battery pack in Comparative Example 1. FIG. 10 is a schematic diagram showing a change over time in the SOC of each of the first cell and the second cell in charging from the initial voltage value of the battery pack in Comparative Example 1. In FIGS. 9 and 10, the abscissa axis shows the time when the start time of charging is 0. In FIG. 9, the ordinate axis shows the current, and in FIG. 10, the ordinate axis shows the SOC. In FIG. 9, the current for charging the battery pack 1 is shown as a negative value. Furthermore, in FIGS. 9 and 10, a change of the parameter related to the first cell 11 is shown by a solid line, and a change of the parameter related to the second cell 21 is shown by a broken line.

As shown in FIGS. 9, 10, etc., in the charging of the battery pack 1 of Comparative Example 1, a large current flowed through the second cell 21 at the start of charging and immediately after the start of charging. Furthermore, in the charging of the battery pack 1 of Comparative Example 1, the SOC of the second cell 21 was higher than the SOC of the first cell 11 including at the start of charging and immediately after the start of charging.

In the first embodiment, the number of the first cells connected in series and the number of the second cells connected in series are set so as to satisfy the condition of the above formula (A1) in the range where the SOC was 0% to 30%. By setting the number of cells connected in series as described above, when the SOCs of the first battery module and the second battery module are the same at Xmin % (Xmin is any value of 0 to 30) which is the lower limit SOC, the voltage of the second battery module is higher than the voltage of the first battery module. As a result, it is suppressed that a large current flows through the second cell at the start of charging and immediately after the start of charging. Therefore, it is possible to provide a storage battery in which both safety in charging with a large current and high energy density are ensured.

Second Embodiment

Next, the second embodiment will be described. In the following description, the description of the same portions as those in the first embodiment and the like will be omitted.

Hereinafter, a method of operating a battery pack 1 (storage battery 2) of the present embodiment will be described. The following description of the operation method will be described with reference to FIGS. 7 and 8 related to Example 2 described later. Also in the present embodiment, an open circuit voltage Va1 (X) at SOC=X % is defined in a first cell 11 alone. In a second cell 21 alone, an open circuit voltage Va2 (X) at SOC=X % is defined. Also in the present embodiment, when the values of the SOCs of the cell 11 and the cell 21 are the same, the open circuit voltage of the first cell 11 alone is lower than the open circuit voltage of the second cell 21 alone, and a relationship of Va1 (X)<Va2 (X) is established. When SOC=X %, the open circuit voltage of a first battery module 10 is M×Va1 (X) by using the number M of the first cells 11 connected in series in the first battery module 10. Furthermore, when SOC=X %, the open circuit voltage of the second battery module 20 is N×Va2 (X) by using the number N of the second cells 21 connected in series in the second battery module 20.

In the battery pack 1 of the present embodiment, since the battery modules 10 and 20 are connected in parallel, the voltages of the battery modules 10 and 20 are the same or substantially the same as each other during the operation of the battery pack 1. Further, in the battery pack 1 (storage battery 2), an upper limit voltage value Vpmax is set. The upper limit voltage value Vpmax of the battery pack 1 (storage battery 2) is set to the lower one of the upper limit voltage value of the first battery module 10 and the upper limit voltage value of the second battery module 20 from the viewpoint of ensuring safety and durability. Furthermore, in the battery pack 1, for example, at the start of discharging and immediately after the start of discharging, etc., it is necessary to suppress flow of a large current through each of the second cells 21 containing a carbonaceous material as the negative electrode active material, and prevent excessive heat generation of each of the second cells 21 and expansion of local bias in. SOC distribution inside the second cell 21. A cell for increasing the capacity such as the second cell 21 is generally designed to increase the capacity by increasing a density of an electrode or increasing a thickness of the electrode. In a cell designed to increase the capacity in this way, it is required to suppress uneven distribution of lithium ions inside the electrode by suppressing discharging with a large current, that is, to suppress deterioration by suppressing occurrence of local bias in the SOC distribution. Thus, in the present embodiment, when discharging is performed from the storage battery 2 such that the upper limit voltage value Vpmax or a value slightly lower than the upper limit voltage value Vpmax is set as an initial voltage value, the battery pack is operated under a condition that resistance of the second cell 21 is higher than resistance of the first cell 11 at the start of discharging and immediately after the start of discharging, etc. As a result, it is suppressed that a large current is rapidly output from each of the second cells 21 at the start of discharging and immediately after the start of discharging, etc.

In order to operate the battery pack 1 under the above-mentioned conditions, in the present embodiment, the number M of the first cells 11 connected in series in the first battery module 10 and the number N of the second cells 21 connected in series in the second battery module 20 are set so as to satisfy a formula (A2) in a range where the SOC of each of the first cell 11 and the second cell 21 is 70% to 100%. Thus, if the SOCs of the first battery module 10 and the second battery module 20 are the same at any value in the range of 70% to 100%, the voltage of the second battery module 20 is lower than the voltage of the first battery module 10. If the voltages of the battery modules 10 and 20 are the same at either the upper limit voltage value Vpmax of the battery pack 1 described above or the value slightly lower than the upper limit voltage value Vpmax, the SOC of the second battery module 20 is higher than the SOC of the first battery module 10.

$$M \times Va1(X) > N \times Va2(X)(70 \leq X \leq 100) \quad (A2)$$

In each of the first cell 11 and the second cell 21, the voltage when the SOC is Xmax % is defined as the upper limit voltage value. Here, Xmax indicates an upper limit SOC of each of the cells 11 and 21, and is any value of 70 to 100. An upper limit voltage value M×Va1 (Xmax) of the first battery module 10 is defined from an upper limit voltage value Va1 (Xmax) of the first cell 11, and an upper limit voltage value N×Va2 (Xmax) of the second battery module 20 is defined from an upper limit voltage value Va2 (Xmax) of the second cell 21.

As described above, the upper limit voltage value Vpmax of the battery pack 1 (storage battery 2) is set to the lower one of the upper limit voltage value M×Va1 (Xmax) of the first battery module 10 and the upper limit voltage value N×Va2 (Xmax) of the second battery module 20. From the equation (A2), the upper limit voltage value N×Va2 (Xmax) of the second battery module 20 is lower than the upper limit voltage value M×Va1 (Xmax) of the first battery module 10. That is, if the SOCs of the first battery module 10 and the second battery module 20 are the same at Xmax % which is the upper limit SOC, the voltage of the second battery module 20 is lower than the voltage of the first battery module 10. Therefore, in the present embodiment, the upper limit voltage value N×Va2 (Xmax) of the second battery module 20 is set as the upper limit voltage value Vpmax of the battery pack 1, and the battery pack 1 (storage battery 2) is operated in a state where the voltage is the upper limit voltage value N×Va2 (Xmax) of the second battery module 20 or less.

As shown in FIG. 2, in many types of cells, the resistance tends to be high in the range where the SOC is 70% to 100% (range E1 in FIG. 2), that is, in a region where the SOC is high. That is, in many types of cells, the resistance tends to be higher in the range where the SOC is 70% to 100% than the resistance in the range where the SOC is 30% to 70%. In particular, in the first cell 11 containing titanium composite oxide as the negative electrode active material (see change patterns α1 and α2 in FIG. 2), the resistance greatly increases in the region where the SOC is high. Thus, for example when discharging is rapidly performed with a large current from the storage battery 2, it is preferable that the first cell 11 is used in a state where the SOC is less than 70%, that is, in a state where the SOC is out of the high region.

In the present embodiment, discharging is performed from the battery pack 1 with the upper limit voltage value Vpmax as the initial voltage value, for example. In this case, at the start of discharging and immediately after the start of discharging, the voltages of the battery modules 10 and 20 are the same or substantially the same as each other at either the upper limit voltage value Vpmax or the value slightly lower than the upper limit voltage value Vpmax. Thus, at the start of discharging and immediately after the start of discharging, the SOC of the second battery module 20 is higher than the SOC of the first battery module 10, and the SOC of the second cell 21 containing a carbonaceous material as the negative electrode active material is higher than the SOC of the first cell 11 containing titanium composite oxide as the negative electrode active material. Since Xmax is 70 to 100, the SOC of the second battery module 20 (second cell 21) is in the high region, such as the range of 70% to 100%, at the start of discharging and immediately after the start of discharging. Furthermore, at the start of discharging and immediately after the start of discharging, the SOC of the first battery module 10 (first cell 11) is out of the high region, such as the SOC being less than 70%.

Here, from a relationship of the resistance to the SOC in the cell alone shown in FIG. 2, when the battery pack 1 is operated as described above, at the start of discharging from the battery pack 1 and immediately after the start of the discharging, the resistance of the first cell 11, that is, the resistance of the first battery module 10 is low. Thus, at the start of discharging and immediately after the start of discharging, a large current flows through the first battery module 10, and a large current is rapidly output from the first battery module 10. At the start of discharging from the battery pack 1 and immediately after the start of the discharging, the resistance of the second cell 21 is higher than the resistance of the first cell 11, and the resistance of the second battery module 20 is higher than the resistance of the first battery module 10. As a result, even when rapid discharging is performed with a large current from the battery pack 1 with the upper limit voltage value Vpmax or the like as the initial voltage value, it is suppressed that a large current flows through the second battery module 20 at the start of discharging and immediately after the start of discharging, etc. Thus, excessive heat generation of each of the second cells 21, expansion of local bias in SOC distribution inside each of the second cells 21, and the like are effectively prevented. Therefore, the safety of the storage battery 2 (battery pack 1) is ensured in the discharging with a large current, and the durability of the battery pack 1 is ensured.

Hereinafter, Example 2 which is an example of the present embodiment will be described. In Example 2, the first battery module 10 and the second battery module 20 were formed in the same manner as in Comparative Example 1 described above, and the battery pack 1 (storage battery 2) was formed in the same manner as in Comparative Example 1. Thus, in Example 2, the voltage range of each of the battery modules 10 and 20 and a relationship of the voltage to the SOC of each of the battery modules 10 and 20 were the same as those in Comparative Example 1 (see FIGS. 7 and 8).

However, in Example 2, discharging from the battery pack 1 was performed. In Example 2, the upper limit SOC was set to 90% (Xmax=90) in each of the first cell 11 and the second cell 21. The upper limit voltage value of the first cell 11 was set to 2.46 V, which was an open circuit voltage Va1 (90) of the first cell 11 at SOC=90%. The upper limit voltage value of the second cell 21 was set to 4.05 V, which was an open circuit voltage Va2 (90) of the second cell 21 at SOC=90%. Thus, the upper limit voltage value of the first battery module 10 in which the 45 first cells 11 were connected in series was set to 108.3 V, and the upper limit voltage value of the second battery module 20 in which the 26 second cells 21 were connected in series was set to 105.5 V. Therefore, in Example 2, when the SOCs of the battery modules 10 and 20 were the same at Xmax % which was the upper limit SOC, the voltage of the second battery module 20 was lower than the voltage of the first battery module 10. Thus, in Example 2, an upper limit voltage value N×Va2 (90) of the second battery module 20 was used as the upper limit voltage value Vpmax of the battery pack 1 (see FIG. 7). Furthermore, in Example 2, the condition of the above formula (A2) was satisfied in a range where the SOC was 70% to 100%, that is, in the region where the SOC was high (see range ε3 in FIG. 8).

Comparative Example 2 which is a comparative example of the present embodiment will be described. In Comparative Example 2, the first battery module 10 and the second battery module 20 were formed in the same manner as in Example 1 described above, and the battery pack 1 (storage battery 2) was formed in the same manner as in Example 1. Thus, in Comparative Example 2, the voltage range of each of the battery modules 10 and 20 and the relationship of the voltage to the SOC of each of the battery modules 10 and 20 were the same as those in Example 1 (see FIGS. 3 and 4).

However, in Comparative Example 2, discharging from the battery pack 1 was performed as in Example 2. In Comparative Example 2, when the SOCs of the battery modules 10 and 20 were the same at Xmax % which was the upper limit SOC, the voltage of the second battery module 20 was higher than the voltage of the first battery module 10. Thus, in Comparative Example 2, an upper limit voltage value N×Va1 (Xmax) of the first battery module 10 was used as the upper limit voltage value Vpmax of the battery pack 1 (see FIG. 3). Further, in Comparative Example 2, the condition of the above formula (A2) was not satisfied in the range where the SOC was 70% to 100%, that is, in the region where the SOC was high (see range ε2 in FIG. 4). Furthermore, in Comparative Example 2, if the voltages of the battery modules 10 and 20 were the same at either the upper limit voltage value Vpmax of the battery pack 1 or the value slightly lower than the upper limit voltage value Vpmax, the SOC of the first battery module 10 was higher than the SOC of the second battery module 20.

In each of Example 2 and Comparative Example 2, a current of 100 A was output from the battery pack 1, and a constant current was discharged from the battery pack 1. At that time, in each of Example 2 and Comparative Example 2, discharging was performed from a state where the open circuit voltage of the battery pack 1 was 103.4 V, that is, from an initial voltage value of 103.4 V. Therefore, in Example 2, discharging was performed from the initial voltage value slightly lower than the upper limit voltage value Vpmax of the battery pack 1.

FIG. 11 is a schematic diagram showing a change over time in the current flowing through each of the first cell and the second cell in discharging from the initial voltage value of the battery pack in Example 2. FIG. 12 is a schematic diagram showing a change over time in the SOC of each of the first cell and the second cell in discharging from the initial voltage value of the battery pack in Example 2. FIG. 13 is a schematic diagram showing a change over time in a current flowing through each of the first cell and the second cell in discharging from the initial voltage value of the battery pack in Comparative Example 2. FIG. 14 is a schematic diagram showing a change over time in the SOC of each of the first cell and the second cell in discharging from the initial voltage value of the battery pack in Comparative Example 2. FIG. 15 is a schematic diagram showing a change over time in an output power of the battery pack in discharging from the initial voltage value of each of the battery packs of Example 2 and Comparative Example 2. In FIGS. 11 to 15, the abscissa axis shows the time when the start time of discharging is 0. In. FIGS. 11 and 13, the ordinate axis shows the current. In FIGS. 12 and 14, the ordinate axis shows the SOC. In FIG. 15, the ordinate axis shows electric power. In FIGS. 11 and 13, the current discharged from the battery pack 1 is shown as a positive value. In FIGS. 11 to 14, a change of the parameter related to the first cell 11 is shown by a solid line, and a change of the parameter related to the second cell 21 is shown by a broken line. In FIG. 15, a change in Example 2 is shown by a solid line, and a change in Comparative Example 2 is shown by a broken line.

As shown in FIGS. 11, 12, etc., in the discharging from the battery pack 1 of Example 2, at the start of discharging and immediately after the start of discharging, that is, while about 600 seconds had passed since the start of discharging, a large current flowed through the first cell 11, and flow of a large current to the second cell 21 was suppressed. Furthermore, in the discharging from the battery pack 1 of Example 2, the SOC of the second cell 21 was higher than the SOC of the first cell 11 including at the start of discharging and immediately after the start of discharging. On the other hand, as shown in FIGS. 13, 14, etc., in the discharging from the battery pack 1 of Comparative Example 2, a current that was about the same as or slightly larger than the current flowing through the cell 11 flowed through the second cell 21 at the start of discharging and immediately after the start of discharging. Furthermore, in the discharging from the battery pack 1 of Comparative Example 2, the SOC of the second cell 21 was lower than the SOC of the first cell 11 including at the start of discharging and immediately after the start of discharging.

As shown in FIG. 15, in the discharging from the battery pack 1 of Example 2, the output power from the battery pack 1 (storage battery 2) was larger than that of Comparative Example 2. That is, in the discharging from the battery pack 1 of Example 2, it was suppressed that a large current flowed through the second cell 21 at the start of discharging and immediately after the start of discharging, and, at the same time, high output characteristics were achieved. As the reason why high output characteristics were obtained, in Example 2, it is probable that discharging was performed in a state where the SOC of the first battery module 10 (first cell 11) was out of a high region, such as the SOC of the first battery module 10 being less than 70%, that is, the SOC was out of a high resistance region.

In the battery pack 1 of the present embodiment including Example 2, when the SOCs of the first battery module 10 and the second battery module 20 are the same at Xmax % (Xmax is any value of 70 to 100) which is the upper limit SOC, the voltage of the second battery module 20 is lower than the voltage of the first battery module 10. That is, the condition of the above formula (A2) is satisfied in the range where the SOC is 70% to 100%. Thus, in the present embodiment, when discharging is performed such that the upper limit voltage value Vpmax (N×Va2 (Xmax) in the present embodiment) or a value slightly lower than the upper limit voltage value Vpmax is set as an initial voltage value, the SOC of the second battery module 20 (second cell 21) is in a high region such as the range of 70% to 100% at the start of discharging and immediately after the start of discharging. At the start of discharging and immediately after the start of discharging, discharging is performed in a state where the SOC of the first battery module 10 (first cell 11) is lower than the SOC of the second battery module 20. Thus, the resistance of the second battery module 20 is higher than the resistance of the first battery module 10 at the start of discharging and immediately after the start of discharging.

Since the resistance of the second battery module 20 is higher than the resistance of the first battery module 10, it is suppressed that a large current flows through each of the second cells 21 at the start of discharging and immediately after the start of discharging. As a result, excessive heat generation of each of the second cells 21, expansion of local bias in. SOC distribution inside each of the second cells 21, and the like are effectively prevented. Therefore, the safety of the storage battery 2 (battery pack 1) is ensured in the discharging with a large current, and the durability of the battery pack 1 is ensured.

In the present embodiment, discharging is performed in a state where the SOC of the first battery module 10 (first cell 11) is out of the high region, such as the SOC of the first battery module 10 being less than 70%. Thus, the resistance of the first battery module 10 is low at the start of discharging and immediately after the start of discharging. As a result, a large current flows through each of the first cells 11, and the output from the battery pack 1 becomes large. Therefore, discharging can be performed with a large current from the battery pack 1 while ensuring safety and the like, and the output characteristics of the storage battery 2 are ensured.

In the present embodiment, since the second battery module 20 is formed from the second cell 21 containing a carbonaceous material as the negative electrode active material, an energy density of the second battery module 20 is high. The storage battery 2 is formed by connecting the second battery module 20 in parallel with the first battery module 10. Therefore, in the storage battery 2 (battery pack 1) of the present embodiment, both safety in discharging with a large current and high energy density are ensured.

In the second embodiment, the number of the first cells connected in series and the number of the second cells connected in series are set so as to satisfy the condition of the above formula (A2) in the range where the SOC is 70% to 100%. By setting the number of cells connected in series as described above, when the SOCs of the first battery module and the second battery module are the same at. Xmax % (Xmax is any value of 70 to 100) which is the upper limit SOC, the voltage of the second battery module is lower than the voltage of the first battery module. As a result, it is suppressed that a large current flows through the second cell at the start of discharging and immediately after the start of discharging. Therefore, it is possible to provide a storage battery in which both safety in discharging with a large current and high energy density are ensured.

Third Embodiment

Next, the third embodiment will be described. In the following description, the description of the same portions as those in the above embodiments and the like will be omitted.

Hereinafter, a method of operating a battery pack 1 (storage battery 2) of the present embodiment will be described. The following description of the operation method will be described with reference to FIGS. 16 and 17 related to Example 3 described later. Also in the present embodiment, an open circuit voltage Va1 (X) at SOC=X % is defined in a first cell 11 alone. In a second cell 21 alone, an open circuit voltage Va2 (X) at SOC=X % is defined. Also in the present embodiment, when the values of the SOCs of the cell 11 and the cell 21 are the same, the open circuit voltage of the first cell 11 alone is lower than the open circuit voltage of the second cell 21 alone, and a relationship of Va1 (X)<Va2 (X) is established. When SOC=X %, the open circuit voltage of a first battery module 10 is M×Va1 (X) by using the number M of the first cells 11 connected in series in the first battery module 10. Furthermore, when SOC=X %, the open circuit voltage of the second battery module 20 is N×Va2 (X) by using the number N of the second cells 21 connected in series in the second battery module 20.

In the battery pack 1 of the present embodiment, since the battery modules 10 and 20 are connected in parallel, the voltages of the battery modules 10 and 20 are the same or substantially the same as each other during the operation of the battery pack 1. Furthermore, in the battery pack 1 (storage battery 2), the lower limit voltage value Vpmin and the upper limit voltage value Vpmax described above are set. As described above, the lower limit voltage value Vpmin of the battery pack 1 is set to the higher one of the lower limit voltage value of the first battery module 10 and the lower limit voltage value of the second battery module 20. As described above, the upper limit voltage value Vpmax of the battery pack 1 is set to the lower one of the upper limit voltage value of the first battery module 10 and the upper limit voltage value of the second battery module 20.

Thus, in the present embodiment, when the storage battery 2 is charged such that the lower limit voltage value Vpmin or a value slightly higher than the lower limit voltage value Vpmin is set as an initial voltage value, as in the first embodiment, the battery pack 1 is operated under a condition that resistance of the second cell 21 is higher than resistance of the first cell 11 at the start of charging and immediately after the start of charging, etc. As a result, it is suppressed that a large current is rapidly input to each of the second cells 21 at the start of charging and immediately after the start of charging, etc. In the present embodiment, when discharging is performed from the storage battery 2 such that the upper limit voltage value Vpmax or a value slightly lower than the upper limit voltage value Vpmax is set as an initial voltage value, as in the second embodiment, the battery pack 1 is operated under a condition that resistance of the second cell 21 is higher than resistance of the first cell 11 at the start of discharging and immediately after the start of discharging, etc. As a result, it is suppressed that a large current is rapidly output from each of the second cells 21 at the start of discharging and immediately after the start of discharging, etc.

In order to operate the battery pack 1 under the above-mentioned conditions, in the present embodiment, the number M of the first cells 11 connected in series in the first battery module 10 and the number N of the second cells 21 connected in series in the second battery module 20 are set so as to satisfy the above formula (A1) in a range where the SOC of each of the first cell 11 and the second cell 21 is 0% to 30% and the above formula (A2) in a range where the SOC of each of the first cell 11 and the second cell 21 is 70% to 100%. Thus, if the SOCs of the first battery module 10 and the second battery module 20 are the same at any value in the range of 0% to 30%, the voltage of the second battery module 20 is higher than the voltage of the first battery module 10. If the SOCs of the first battery module 10 and the second battery module 20 are the same at any value in the range of 70% to 100%, the voltage of the second battery module 20 is lower than the voltage of the first battery module 10. If the voltages of the battery modules 10 and 20 are the same at either the lower limit voltage value Vpmin of the battery pack 1 described above or the value slightly higher than the lower limit voltage value Vpmin, the SOC of the second battery module 20 is lower than the SOC of the first battery module 10. If the voltages of the battery modules 10 and 20 are the same at either the upper limit voltage value Vpmax of the battery pack 1 described above or the value slightly lower than the upper limit voltage value Vpmax, the SOC of the second battery module 20 is higher than the SOC of the first battery module 10.

In the present embodiment, for each of the cells 11 and 21, the lower limit SOC=Xmin (Xmin is any value of 0 to 30) is defined as in the first embodiment, and the upper limit SOC=Xmax % (Xmax is any value of 70 to 100) is specified as in the second embodiment. In the present embodiment, as in the first embodiment, a lower limit voltage value Va1 (Xmin) of the first cell 11 and a lower limit voltage value M×Va1 (Xmin) of the first battery module 10 are defined, and a lower limit voltage value Va2 (Xmin) of the second cell 21 and a lower limit voltage value N×Va2 (Xmin) of the second battery module 20 are defined. Furthermore, as in the second embodiment, an upper limit voltage value Va1 (Xmax) of the first cell 11 and an upper limit voltage value M×Va1 (Xmax) of the first battery module 10 are defined, and an upper limit voltage value Va2 (Xmax) of the second cell 21 and an upper limit voltage value N×Va2 (Xmax) of the second battery module 20 are defined.

In the present embodiment, since the formula (A1) is satisfied, the lower limit voltage value N×Va2 (Xmin) of the second battery module 20 is higher than the lower limit voltage value M×Va1 (Xmin) of the first battery module 10. That is, if the SOCs of the first battery module 10 and the second battery module 20 are the same at Xmin % which is the lower limit SOC, the voltage of the second battery module 20 is higher than the voltage of the first battery module 10. Therefore, in the present embodiment, the lower limit voltage value N×Va2 (Xmin) of the second battery module 20 is set as the lower limit voltage value Vpmin of the battery pack 1, and the battery pack 1 (storage battery 2) is operated in a state where the voltage is the lower limit voltage value N×Va2 (Xmin) of the second battery module 20 or more.

In the present embodiment, since the formula (A2) is satisfied, the upper limit voltage value N×Va2 (Xmax) of the second battery module 20 is lower than the upper limit voltage value M×Va1 (Xmax) of the first battery module 10. That is, if the SOCs of the first battery module 10 and the second battery module 20 are the same at Xmax which is the upper limit SOC, the voltage of the second battery module 20 is lower than the voltage of the first battery module 10. Therefore, in the present embodiment, the upper limit voltage value N×Va2 (Xmax) of the second battery module 20 is set as the upper limit voltage value Vpmax of the battery pack 1, and the battery pack 1 (storage battery 2) is operated in a state where the voltage is the upper limit voltage value N×Va2 (Xmax) of the second battery module 20 or less.

As shown in FIG. 2, in many types of cells, the resistance tends to be high in a region where the SOC is low (range γ1 in FIG. 2) and a region where the SOC is high (range ε1 in FIG. 2). That is, in many types of cells, the resistance tends to be higher in the range where the SOC is 0% to 30% and the range where the SOC is 70% to 100% than the resistance in the range where the SOC is 30% to 70%. Thus, in the present embodiment, the battery pack 1 is operated under a condition that a range of a change in the SOC of the first cell 11 is within a range of a change in the SOC of the second cell 21. That is, the battery pack 1 is operated under a condition that the lower limit of the range of the change in the SOC of the first cell 11 is higher than the lower limit of the range of the change in the SOC of the second cell 21, and the upper limit of the range of the change in the SOC of the first cell 11 is lower than the upper limit of the range of the change in the SOC of the second cell 21.

In the present embodiment, the battery pack 1 is charged with the lower limit voltage value Vpmin as the initial voltage value, for example. In this case, as in the first embodiment, at the start of charging and immediately after the start of charging, the SOC of the second battery module 20 (second cell 21) is lower than the SOC of the first battery module 10 (first cell 11). Since Xmin is 0 to 30, the SOC of the second battery module 20 (second cell 21) is in a low region, such as the range of 0% to 30%, at the start of charging and immediately after the start of charging. Thus, as in the first embodiment, at the start of charging the battery pack 1 and immediately after the start of the charging, the resistance of the first cell 11 (first battery module 10) is low, and the resistance of the second cell 21 (second battery module 20) is higher than the resistance of the first cell 11 (first battery module 10). As a result, even when the battery pack 1 is rapidly charged with a large current with the lower limit voltage value Vpmin or the like as the initial voltage value, a large current is input only to the first battery module 10 at the start of charging and immediately after the start of charging, etc., and input of a large current to the second battery module 20 is suppressed. By suppressing the input of a large current to the second battery module 20 as described above, also in the present embodiment as in the first embodiment, the safety of the storage battery 2 (battery pack 1) is ensured in the charging with a large current, and the durability of the battery pack 1 is ensured.

In the present embodiment, discharging is performed from the battery pack 1 with the upper limit voltage value Vpmax as the initial voltage value, for example. In this case, as in the second embodiment, at the start of discharging and immediately after the start of discharging, the SOC of the second battery module 20 (second cell 21) is higher than the SOC of the first battery module 10 (first cell 11). Since Xmax is 70 to 100, the SOC of the second battery module 20 (second cell 21) is in the high region, such as the range of 70% to 100%, at the start of discharging and immediately after the start of discharging. Furthermore, at the start of discharging and immediately after the start of discharging, the SOC of the first battery module 10 (first cell 11) is out of the high region, such as the SOC being less than 70%. Thus, as in the second embodiment, at the start of discharging from the battery pack 1 and immediately after the start of the discharging, the resistance of the first cell 11 (first battery module 10) is low, and a large current is output rapidly from the first battery module 10. At the start of discharging from the battery pack 1 and immediately after the start of the discharging, as in the second embodiment, the resistance of the second cell 21 (second battery module 20) is higher than the resistance of the first cell 11 (first battery module 10). As a result, even when rapid discharging is performed with a large current from the battery pack 1 with the upper limit voltage value Vpmax or the like as the initial voltage value, it is suppressed that a large current flows through the second battery module 20 at the start of discharging and immediately after the start of discharging, etc. By suppressing the flow of a large current to the second battery module 20 as described above, also in the present embodiment as in the second embodiment, the safety of the storage battery 2 (battery pack 1) is ensured in the discharging with a large current, and the durability of the battery pack 1 is ensured.

Figure 16:
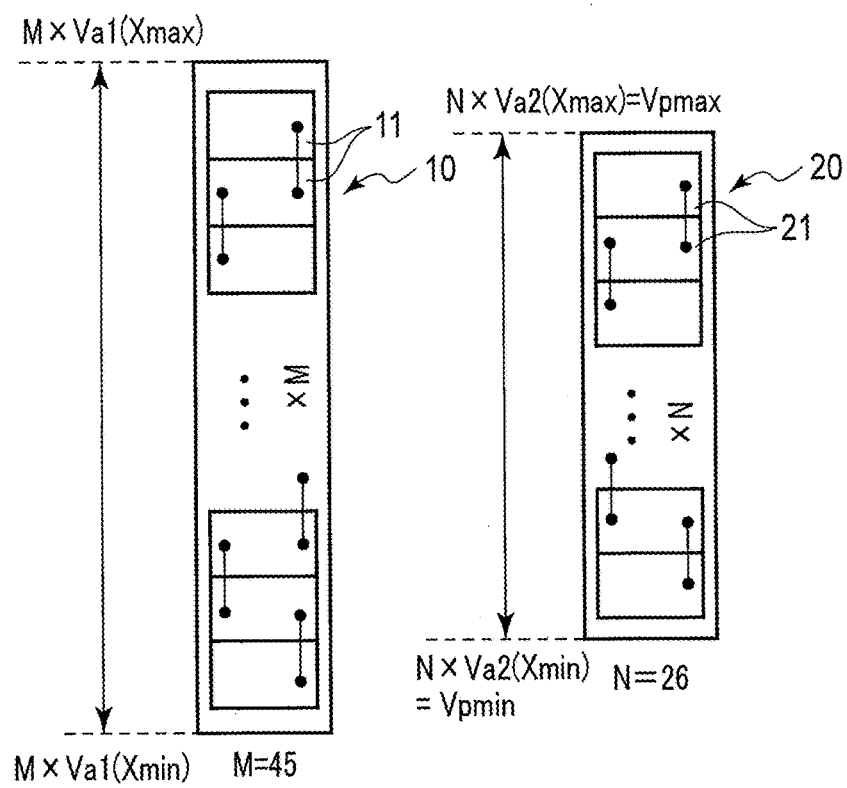
FIG. 16 is a schematic diagram showing a configuration and a voltage range of each of the first battery module and the second battery module in Example 3.
Figure 17:
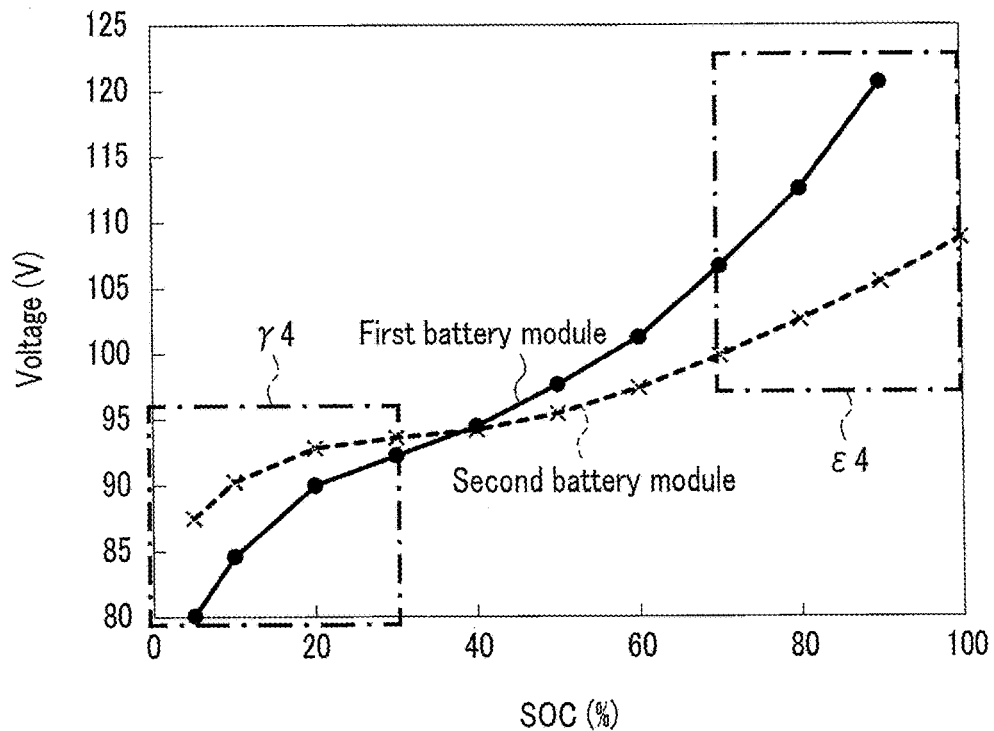
FIG. 17 is a schematic diagram showing a relationship of the voltage to the SOC for each of the first battery module and the second battery module in Example 3.

Hereinafter, Example 3 which is an example of the present embodiment will be described. FIG. 16 is a schematic diagram showing a configuration and a voltage range of each of the first battery module and the second battery module in Example 3. FIG. 17 is a schematic diagram showing a relationship of the voltage to the SOC for each of the first battery module and the second battery module in Example 3. In FIG. 17, the abscissa axis shows the SOC of the battery module, and the ordinate axis shows the voltage of the battery module. Furthermore, in FIG. 17, a change in the voltage M×V1 of the first battery module 10 is shown by a solid line, and a change in the voltage N×V2 of the second battery module 20 is shown by a broken line.

As shown in FIG. 16, etc., in Example 3, the 45 first cells 11 were electrically connected in series to form the first battery module 10 in which the number of the first cells 11 connected in series was 45 (M=45), and the 26 second cells 21 were electrically connected in series to form the second battery module 20 in which the number of the second cells 21 connected in series was 26 (N=26). The storage battery 2 (battery pack 1) was formed by electrically connecting the first battery module 10 and the second battery module 20 in parallel. As the first cell 11, a nonaqueous electrolyte cell containing monoclinic niobium titanium composite oxide as the negative electrode active material and having a capacity (fully charged capacity) of 20 Ah was used. As the second cell 21, as in Example 1, etc., a nonaqueous electrolyte cell containing graphite as the negative electrode active material and having a capacity (fully charged capacity) of 20 Ah was used.

In Example 3, the lower limit SOC was set to 10% (Xmin=10) in each of the first cell 11 and the second cell 21. The lower limit voltage value of the first cell 11 was set to 1.88 V, which was the open circuit voltage Va1 (10) of the first cell 11 at SOC=10%, and the lower limit voltage value of the second cell 21 was set to 3.47 V, which was the open circuit voltage Vat (10) of the second cell 21 at SOC=10%. Thus, the lower limit voltage value of the first battery module 10 in which the 45 first cells 11 were connected in series was set to 84.3 V, and the lower limit voltage value of the second battery module 20 in which the 26 second cells 21 were connected in series was set to 90.3 V. Therefore, in Example 3, when the SOCs of the battery modules 10 and 20 were the same at Xmin % which was the lower limit SOC, the voltage of the second battery module 20 was higher than the voltage of the first battery module 10. Furthermore, in Example 3, the condition of the above formula (A1) was satisfied in the range where the SOC was 0% to 30%, that is, in the region where the SOC was low (see range γ4 in FIG. 17). In Example 3, the battery pack 1 was operated with a lower limit voltage value N×Va2 (10) of the second battery module 20 as the lower limit voltage value Vpmin of the battery pack 1.

In Example 3, the upper limit SOC was set to 90% (Xmax=90) in each of the first cell 11 and the second cell 21. The upper limit voltage value of the first cell 11 was set to 2.68 V, which was the open circuit voltage Va1 (90) of the first cell 11 at SOC=90%, and the upper limit voltage value of the second cell 21 was set to 4.05 V, which was the open circuit voltage Va2 (90) of the second cell 21 at SOC=90%. Thus, the upper limit voltage value of the first battery module 10 was set to 120.6 V, and the upper limit voltage value of the second battery module 20 was set to 105.5 V. Therefore, in Example 3, when the SOCs of the battery modules 10 and 20 were the same at Xmax % which was the upper limit SOC, the voltage of the second battery module 20 was lower than the voltage of the first battery module 10. Furthermore, in Example 3, the condition of the above formula (A2) was satisfied in a range where the SOC was 70% to 100%, that is, in the region where the SOC was high (see range ε4 in FIG. 17). In Example 3, the battery pack 1 was operated with an upper limit voltage value N×Va2 (90) of the second battery module 20 as the upper limit voltage value Vpmax of the battery pack 1.

Figure 18:
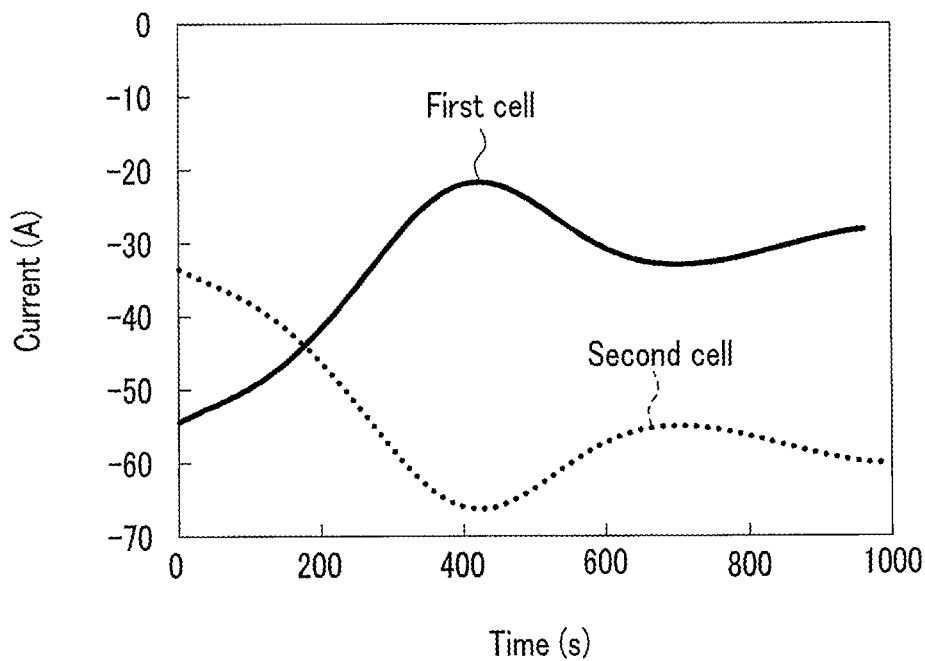
FIG. 18 is a schematic diagram showing a change over time in the current flowing through each of the first cell and the second cell in charging from a lower limit voltage value of the battery pack in Example 3.
Figure 19:
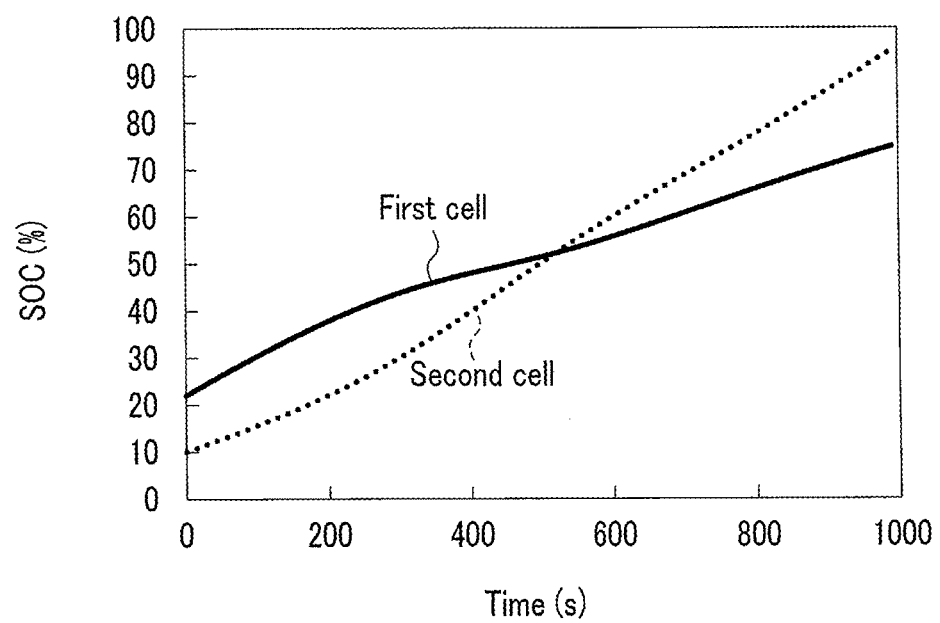
FIG. 19 is a schematic diagram showing a change over time in the SOC of each of the first cell and the second cell in charging from the lower limit voltage value of the battery pack in Example 3.

In Example 3, a current of 100 A was input to the battery pack 1, and the battery pack 1 was charged at a constant current from the lower limit voltage value Vpmin. That is, charging was started with the lower limit voltage value Vpmin as the initial voltage value. FIG. 18 is a schematic diagram showing a change over time in the current flowing through each of the first cell and the second cell in charging from the lower limit voltage value of the battery pack in Example 3. FIG. 19 is a schematic diagram showing a change over time in the SOC of each of the first cell and the second cell in charging from the lower limit voltage value of the battery pack in Example 3. In FIGS. 18 and 19, the abscissa axis shows the time when the start time of charging is 0. In FIG. 18, the ordinate axis shows the current, and in FIG. 19, the ordinate axis shows the SOC. In FIG. 18, the current for charging the battery pack 1 is shown as a negative value. Furthermore, in FIGS. 18 and 19, a change of the parameter related to the first cell 11 is shown by a solid line, and a change of the parameter related to the second cell 21 is shown by a broken line.

As shown in FIGS. 18 and 19, etc., in the charging of the battery pack 1 of Example 3, at the start of charging and immediately after the start of charging, that is, while about 200 seconds had passed since the start of charging, a large current flowed through the first cell 11, and input of a large current to the second cell 21 was suppressed. Therefore, it was demonstrated that the charging in Example exhibited the same action and effects as the first embodiment also in the present embodiment.

That is, even in the battery pack 1 of the present embodiment including Example 3, when charging is performed such that the lower limit voltage value Vpmin (N×Va2 (Xmin) in the present embodiment) or a value slightly higher than the lower limit voltage value Vpmin is set as an initial voltage value, the SOC of the second battery module 20 (second cell 21) is in a low region such as the range of 0% to 30% at the start of charging and immediately after the start of charging. At the start of charging and immediately after the start of charging, charging is performed in a state where the SOC of the first battery module 10 (first cell 11) is higher than the SOC of the second battery module 20. Thus, as in the first embodiment, it is suppressed that a large current flows through each of the second cells 21 at the start of charging and immediately after the start of charging. Therefore, the safety of the storage battery 2 (battery pack 1) is ensured in the charging with a large current, and the durability of the battery pack 1 is ensured. Since a large current flows through each of the first cells 11 at the start of charging and immediately after the start of charging, the battery pack 1 can be charged with a large current while ensuring safety and the like.

In Example 3, a current of 100 A was output from the battery pack 1, and a constant current was discharged from the battery pack 1. At that time, in Example 3, discharging was performed from a state where the open circuit voltage of the battery pack 1 was 99.9 V, that is, from an initial voltage value of 99.9 V. Therefore, in Example 3, discharging was performed from the initial voltage value slightly lower than the upper limit voltage value Vpmax of the battery pack 1. FIG. 20 is a schematic diagram showing a change over time in the current flowing through each of the first cell and the second cell in discharging from the initial voltage value of the battery pack in Example 3. FIG. 21 is a schematic diagram showing a change over time in the SOC of each of the first cell and the second cell in discharging from the initial voltage value of the battery pack in Example 3. In FIGS. 20 and 21, the abscissa axis shows the time when the start time of discharging is 0. In FIG. 20, the ordinate axis shows the current, and in FIG. 21, the ordinate axis shows the SOC. In FIG. 20, the current discharged from the battery pack 1 is shown as a positive value. Furthermore, in FIGS. 20 and 21, a change of the parameter related to the first cell 11 is shown by a solid line, and a change of the parameter related to the second cell 21 is shown by a broken line.

As shown in FIGS. 20, 21, etc., in the discharging from the battery pack 1 of Example 3, at the start of discharging and immediately after the start of discharging, a large current flowed through the first cell 11, and flow of a large current to the second cell 21 was suppressed. Therefore, it was demonstrated that the discharging in Example 3 exhibited the same action and effects as the second embodiment also in the present embodiment.

That is, even in the battery pack 1 of the present embodiment including Example 3, when discharging is performed such that the upper limit voltage value Vpmax (N×Va2 (Xmax) in the present embodiment) or a value slightly lower than the upper limit voltage value Vpmax is set as an initial voltage value, the SOC of the second battery module (second cell 21) is in a high region such as the range of 70% to 100% at the start of discharging and immediately after the start of discharging. At the start of discharging and immediately after the start of discharging, discharging is performed in a state where the SOC of the first battery module 10 (first cell 11) is lower than the SOC of the second battery module 20. Thus, as in the second embodiment, it is suppressed that a large current flows through each of the second cells 21 at the start of discharging and immediately after the start of discharging. Therefore, the safety of the storage battery 2 (battery pack 1) is ensured in the discharging with a large current, and the durability of the battery pack 1 is ensured. Since a large current flows through each of the first cells 11 at the start of discharging and immediately after the start of discharging, discharging can be performed from the battery pack 1 with a large current while ensuring safety and the like.

In the present embodiment, since the second battery module 20 is formed from the second cell 21 containing a carbonaceous material as the negative electrode active material, an energy density of the second battery module 20 is high. The storage battery 2 is formed by connecting the second battery module 20 in parallel with the first battery module 10. Therefore, in the storage battery 2 (battery pack 1) of the present embodiment, both safety in each of charging and discharging with a large current and high energy density are ensured.

In the third embodiment, the number of the first cells connected in series and the number of the second cells connected in series are set so as to satisfy the condition of the above formula (A1) in a range where the SOC is 0% to 30% and the condition of the above formula (A2) in the range where the SOC is 70% to 100%. By setting the number of cells connected in series as described above, when the SOCs of the first battery module and the second battery module are the same at Xmin % (Xmin is any value of 0 to 30) which is the lower limit SOC, the voltage of the second battery module is higher than the voltage of the first battery module. As a result, it is suppressed that a large current flows through the second cell at the start of charging and immediately after the start of charging. By setting the number of cells connected in series as described above, when the SOCs of the first battery module and the second battery module are the same at Xmax % (Xmax is any value of 70 to 100) which is the upper limit SOC, the voltage of the second battery module is lower than the voltage of the first battery module. As a result, it is suppressed that a large current flows through the second cell at the start of discharging and immediately after the start of discharging. Therefore, it is possible to provide a storage battery in which both safety in each of charging and discharging with a large current and high energy density are ensured.

In the storage battery of at least one embodiment or Example described above, the voltages of the battery modules are at least one of M×Va1 (X)<N×Va2 (X) in the range where the SOC of the cell is 0% to 30%, or M x Va1 (X)<N×Va2 (X) in the range where the SOC of the cell is 70% to 100%. Accordingly, it is possible to provide a storage battery in which both safety in charging or discharging with a large current and high energy density are ensured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage battery comprising:
   a first battery module including a plurality of first cells connected in series, each of the plurality of first cells containing titanium composite oxide as a negative electrode active material; and
   a second battery module including a plurality of second cells connected in series, each of the plurality of second cells containing a carbonaceous material as a negative electrode active material, the second battery module being connected in parallel with the first battery module,
   wherein
   a voltage of the storage battery is changeable between a lower limit voltage value and an upper limit voltage value,
   at the lower limit voltage value of the storage battery, an SOC of the second battery module is lower than an SOC of the first battery module, and a resistance of the second battery module is higher than a resistance of the first battery module,
   at the upper limit voltage value of the storage battery, the SOC of the second battery module is higher than the SOC of the first battery module, and the resistance of the second battery module is higher than the resistance of the first battery module, and
   the first battery module and the second battery module satisfy the following formulas (1) and (2):

$$M \times Va1(X) < N \times Va2(X)(0 \leq X \leq 30); \text{ and} \quad (1)$$

$$M \times Va1(X) > N \times Va2(X)(70 \leq X \leq 100), \quad (2)$$

wherein Va1 (X) represents an open circuit voltage at SOC=X % of each of the plurality of first cells, Va2 (X) represents an open circuit voltage at SOC=X % of each of the plurality of second cells, M represents the number of the plurality of first cells connected in series in the first battery module, and N represents the number of the plurality of second cells connected in series in the second battery module.

2. The storage battery according to claim 1, wherein
each of the plurality of first cells contains monoclinic niobium titanium composite oxide as the negative electrode active material,
each of the plurality of second cells contains graphite as the negative electrode active material, and
the first battery module and the second battery module satisfy the following formulas (3) and (4):

$$M \times 1.88 < N \times 3.47; \text{ and} \quad (3)$$

$$M \times 2.68 > N \times 4.05. \quad (4)$$

* * * * *